United States Patent
Zhang et al.

(10) Patent No.: US 8,458,109 B2
(45) Date of Patent: Jun. 4, 2013

(54) METHOD AND APPARATUS FOR SPATIO-TEMPORAL COMPRESSIVE SENSING

(75) Inventors: Yin Zhang, Austin, TX (US); Lili Qiu, Austin, TX (US)

(73) Assignees: Yin Zhang, Austin, TX (US); Lili Qui, Austin, TX (US)

( * ) Notice: Subject to any disclaimer, the term of this patent is extended or adjusted under 35 U.S.C. 154(b) by 641 days.

(21) Appl. No.: 12/787,428

(22) Filed: May 26, 2010

(65) Prior Publication Data
US 2010/0306290 A1 Dec. 2, 2010

Related U.S. Application Data

(60) Provisional application No. 61/181,613, filed on May 27, 2009.

(51) Int. Cl.
*G06F 17/00* (2006.01)

(52) U.S. Cl.
USPC .......................................................... 706/45

(58) Field of Classification Search
USPC ........................................ 706/12, 20, 45–47
See application file for complete search history.

(56) References Cited

U.S. PATENT DOCUMENTS

| 7,293,086 B1 | 11/2007 | Duffield et al. |
|---|---|---|
| 7,574,506 B1 | 8/2009 | Duffield et al. |
| 7,646,924 B2 | 1/2010 | Donoho |

OTHER PUBLICATIONS

Donoho, D. L. (2006). Compressed sensing. Information Theory, IEEE Transactions on, 52(4), 1289-1306.*

Raiko, T., Ilin, A., & Karhunen, J. (Jan. 2008). Principal component analysis for sparse high-dimensional data. In Neural Information Processing (pp. 566-575). Springer Berlin Heidelberg.*

Acharya, T., & Tsai, P. S. (2007). Computational foundations of image interpolation algorithms. ACM Ubiquity, 8, 1-17.*

P. Barford, J. Kline, D. Plonka, and A. Ron. A signal analysis of network traffic anomalies. In Proceedings of ACM SIGCOMM Internet Measurement Workshop, Nov. 6-8, 2002.

R. Bell, Y. Koren, and C. Volinksy. Chasing the $1,000,000: How we won the Netflix progress prize. Statistical Computing and Graphics, 18(2), 2007.

E. Candes and B. Recht. Exact matrix completion via convex optimization. Foundations of Computational Mathematics. pp. 717-772. 2009.

E. Candes and T. Tao. Near optimal signal recovery from random projections: Universal encoding strategies? IEEE Transactions on Information Theory, 52(12):5406-5425, 2006.

F. R. K. Chung. Spectral Graph Theory. CBMS Lecture Notes. AMS Publications, 1996.

D. Donoho. Compressed sensing. IEEE Trans. on Information Theory, 52(4):1289-1306, 2006.

(Continued)

*Primary Examiner* — David Vincent

(57) ABSTRACT

A method and apparatus for spatio-temporal compressive sensing, which allows accurate reconstruction of missing values in any digital information represented in matrix or tensor form, is disclosed. The method of embodiments comprises three main components: (i) a method for finding sparse, low-rank approximations of the data of interest that account for spatial and temporal properties of the data, (ii) a method for finding a refined approximation that better satisfies the measurement constraints while staying close to the low-rank approximations obtained by SRMF, and (iii) a method for combining global and local interpolation. The approach of embodiments also provides methods to perform common data analysis tasks, such as tomography, prediction, and anomaly detection, in a unified fashion.

30 Claims, 8 Drawing Sheets

OTHER PUBLICATIONS

V. Erramilli, M. Crovella, and N. Taft. An independent-connection model for traffic matrices. In Proc. of Internet Measurement Conference (IMC), Oct. 25-27, 2006.

A. Feldmann, A. Greenberg, C. Lund, N. Reingold, J. Rexford, and F. True. Deriving traffic demands for operational IP networks: Methodology and experience. IEEE/ACM Transactions on Networking, pp. 265-279, 2001.

B. Fortz and M. Thorup. Optimizing OSPF/IS-IS weights in a changing world. IEEE JSAC Special Issue on Advances in Fundamentals of Network Management, Spring 2002.

L. Huang, X. Nguyen, M. Garofalakis, J. Hellerstein, M. Jordan, M. Joseph, and N. Taft. Communication-efficient online detection of network-wide anomalies. In Proceedings of IEEE INFOCOM, 2007.

A. Lakhina, M. Crovella, and C. Diot. Diagnosing network-wide traffic anomalies. In Proceedings of ACM SIGCOMM, 2004.

D. D. Lee and H. S. Seung. Algorithms for non-negative matrix factorization. In Proceedings of Neural Information Processing Systems (NIPS), pp. 556-562, 2000.

A. Medina, N. Taft, K. Salamatian, S. Bhattacharyya, and C. Diot. Traffic matrix estimation: Existing techniques and new directions. In Proceedings of ACM SIGCOMM, 2002.

B. Recht, M. Fazel, and P. A. Parrilo. Guaranteed Minimum Rank Solutions to Linear Matrix Equations via Nuclear Norm Minimization. Preprint. 2007.

B. Recht, W. Xu, and B. Hassibi. Necessary and sufficient conditions for success of the nuclear norm heuristic for rank minimization. In Proceedings of 47th IEEE Conference on Decision and Control, 2008.

H. Ringberg, A. Soule, J. Rexford, and C. Diot. Sensitivity of PCA for traffic anomaly detection. In Proceedings of ACM SIGMETRICS, 2007.

A. Soule, A. Lakhina, N. Taft, K. Papagiannaki, K. Salamatian, A. Nucci, M. Crovella, and C. Diot. Traffic matrices: Balancing measurements, inference and modeling. In Proceedings of ACM SIGMETRICS, pp. 362-373, 2005.

Y. Vardi. Network tomography. Journal of the Amer. Stat. Assoc., Mar. 1996.

Y. Zhang, Z. Ge, M. Roughan, and A. Greenberg. Network anomography. In Proceedings of Internet Measurement Conference (IMC), 2005.

Y. Zhang, M. M Roughan, N. Duffield, and A. Greenberg. Fast accurate computation of large-scale IP traffic matrices from link loads. In Proceedings of ACM SIGMETRICS, 2003.

Y. Zhang, M. Roughan, C. Lund, and D. Donoho. An information-theoretic approach to traffic matrix estimation. In Proceedings of ACM SIGCOMM, 2003.

Y. Zhang, M. Roughan, C. Lund, and D. Donoho. Estimating point-to-point and point-to-multipoint traffic matrices: An information-theoretic approach. IEEE/ACM Transactions on Networking, 13(5):947-960, 2005.

Q. Zhao, Z. Ge, J. Wang, and J. Xu. Robust traffic matrix estimation with imperfect information: Making use of multiple data sources. SIGMETRICS Perform. Eval. Rev., 34(1):133-144, 2006.

* cited by examiner

FIG. 1A　　　FIG. 1B

METHOD AND APPARATUS FOR SPATIO-TEMPORAL COMPRESSIVE SENSING

RELATED APPLICATIONS

The present application claims the priority benefits of Zhang et al., U.S. Provisional Patent Application No. 61/181,613 titled, "SPATIO-TEMPORAL COMPRESSIVE SENSING ON TRAFFIC MATRICES", filed on May 27, 2009, which is hereby incorporated by reference in its entirety.

FIELD OF THE INVENTION

This invention relates generally to the processing of digital information. More particularly, the invention relates to a method and apparatus for allowing accurate reconstruction of missing values in any digital information represented in the form of a matrix (i.e., two-dimensional array) or more generally in the form of a tensor (i.e., multi-dimensional array).

BACKGROUND OF THE INVENTION

A variety of digital information is represented in the form of a matrix (i.e., two-dimensional array) or more generally in the form of a tensor (i.e., multi-dimensional array). Examples of matrix-formed digital information may include: traffic matrix (which describes the volumes of traffic associated with different source-destination pairs in a network at different times), delay matrix (which describes the round-trip delays between nodes in a network), a social proximity matrix (which specifies the social proximity/closeness between users in a social network), a digital image (which specifies the color at different coordinates), a spatio-temporal signal (which specifies the value of the signal at different spatial locations and different times), and the like. One example of tensor-formed digital information is a digital video (which specifies the pixel at different X-Y coordinates at different times). The traffic matrix may also be naturally represented as a three-dimensional array (resulting in a tensor), with the three dimensions being traffic source, traffic destination, and time. Such matrix-formed or tensor-formed digital information may be essential input for a wide range of applications. For example, traffic matrices (TMs), which specify the traffic volumes between origin and destination pairs in a network, are critical inputs to many network engineering tasks, such as traffic engineering (See, B. Fortz and M. Thorup, "Optimizing OSPF/IS-IS weights in a changing world," *IEEE JSAC Special Issue on Advances in Fundamentals of Network Management*, Spring 2002 (Fortz et al. 2002), M. Roughan, M. Thorup, and Y. Zhang, "Traffic engineering with estimated traffic matrices," *Proc. of Internet Measurement Conference (IMC)*, 2003 (Roughan et al. 2003)), capacity planning, and anomaly detection.

In practice, it may be challenging to measure the data of interest directly, completely, accurately, and at all times. A significant challenge faced by many applications that require such matrix-formed or tensor-formed digital information is therefore how to cope with missing values that frequently arise in real-world dataset. Since many applications that require such data are either intolerant or highly sensitive to missing data, it is important to accurately reconstruct the missing values based on partial and/or indirect measurements. Interpolation is the mathematical term for filling in these missing values.

Compressive sensing (also known as compressed sensing) is a generic methodology for dealing with missing values that leverages the presence of certain types of structure and redundancy in data from many real-world systems. Compressive sensing has recently attracted considerable attention in statistics, approximation theory, information theory, and signal processing. Several effective heuristics have been proposed to exploit the sparse or low-rank nature of data (See, E. Candes and B. Recht, "Exact matrix completion via convex optimization," *Foundations of Computational Mathematics*, 9:717-772, 2009 (Candes et al. 2009), E. Candes and T. Tao, "Near optimal signal recovery from random projections: Universal encoding strategies?" *IEEE Trans. on Information Theory*, 52(12):5406-5425, 2006 (Candes et al. 2006), D. Donoho, "Compressed sensing," *IEEE Trans. on Information Theory*, 52(4):1289-1306, 2006 (Donoho 2006), B. Recht, M. Fazel, and P. A. Parrilo, "Guaranteed Minimum Rank Solutions to Linear Matrix Equations via Nuclear Norm Minimization," *Preprint*, 2007 (Recht et al. 2007), B. Recht, W. Xu, and B. Hassibi, "Necessary and sufficient conditions for success of the nuclear norm heuristic for rank minimization," *Proc. of 47th IEEE Conference on Decision and Control*, 2008 (Recht et al. 2008)). Meanwhile, the mathematical theory of compressive sensing has also advanced to the point where the optimality of many of these heuristics has been proven under certain technical conditions on the matrices of interest.

Despite much progress in the area of compressive sensing, the existing compressive sensing algorithms often do not perform well for missing value interpolation on real-world data matrices or tensors, especially under structured, high data loss (e.g., see Section 3 for results in the context of traffic matrices). The main reason is that real-world data often exhibit characteristics that violate the mathematical conditions under which existing compressive sensing algorithms are designed to operate and are provably optimal. Specifically, the optimality results for existing compressive sensing algorithms often assume that (i) the matrix elements are drawn from a Gaussian or Gaussian-like distribution, (ii) the matrix is exactly low-rank, (iii) data loss is independent for different matrix elements, and (iv) the measurement constraints on the matrix satisfy a certain technical conditions, e.g., the restricted isometry property (See Recht et al. 2007). Unfortunately, these conditions may not hold for real data. For example, real traffic matrix elements often exhibit a highly skewed distribution, where the largest and smallest elements often differ in size by several orders of magnitude. Moreover, real traffic matrices are only approximately low-rank, and data loss tends to be highly structured—data may be missing either spatially (entire rows or columns of the matrix may be missing), or temporally (matrix elements over entire segments in time may be missing), or in some combination. Finally, there is no guarantee that the constraints arising from real-world matrix measurements satisfy the required technical condition.

Therefore, there is a need to develop effective techniques to accurately reconstruct missing values in real-world digital information represented in matrix or tensor form.

BRIEF SUMMARY OF THE INVENTION

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

The present invention broadly discloses a method and apparatus for spatio-temporal compressive sensing that allow accurate reconstruction of missing values in any digital information represented in the form of a matrix (i.e., multi-dimensional array) or a tensor (i.e., multi-dimensional array).

In one embodiment, a method called SPARSITY REGULARIZED MATRIX FACTORIZATION (SRMF) is provided to find sparse, low-rank approximations of the data of interest that account for spatial and temporal properties of the real data. The method of embodiment provides a genuine spatio-temporal model of matrix-formed or tensor-formed data. In contrast, most past approaches may be best described as either purely spatial (See, V. Erramilli, M. Crovella, and N. Taft, "An independent-connection model for traffic matrices," *Proc. of Internet Measurement Conference (IMC)*, 2006 (Erramilli et al. 2006), A. Lakhina, M. Crovella, and C. Diot, "Diagnosing network-wide traffic anomalies," *Proc. of ACM SIGCOMM*, 2004 (Lakhina et al. 2004a), A. Lakhina, K. Papagiannaki, M. Crovella, C. Diot, E. D. Kolaczyk, and N. Taft, "Structural analysis of network traffic flows," *Proc. of ACM SIGMETRICS/Performance*, 2004 (Lakhina et al. 2004b), Y. Zhang, M. Roughan, N. Duffield, and A. Greenberg, "Fast accurate computation of large-scale IP traffic matrices from link load," *Proc. of ACM SIGMETRICS*, 2003 (Zhang et al. 2003a), Y. Zhang, M. Roughan, C. Lund, and D. Donoho, "An information-theoretic approach to traffic matrix estimation," *Proc. of ACM SIGCOMM*, 2003 (Zhang et al. 2003b), Y. Zhang, M. Roughan, C. Lund, and D. Donoho, "Estimating point-to-point and point-to-multipoint traffic matrices: An information-theoretic approach," *IEEE/ACM Transactions on Networking*, 13(5):947-960, 2005 (Zhang et al. 2005a)) or purely temporal (See, P. Barford, J. Kline, D. Plonka, and A. Ron, "A signal analysis of network traffic anomalies," *Proc. of ACM SIGCOMM Internet Measurement Workshop*, 2002 (Barford et al. 2002), Y. Vardi, "Network tomography," *Journal of the Amer. Stat. Assoc.*, March 1996 (Vardi 1996)).

In another embodiment, a method called Tomo-SRMF is provided to find an approximation to the data of interest that better satisfies the measurement constraints while staying close to the low-rank approximations obtained by SRMF. Specifically, the strategy of the method of embodiments is to use the low-rank approximation obtained by SRMF as a prior and derive a refined approximation that is no longer strictly low-rank but is close to the low-rank prior and can also account for existing measurement constraints and/or knowledge about the spatio-temporal structure and redundancy.

In still another embodiment, a method is provided to further enhance reconstruction accuracy by combining global reconstruction methods (i.e., SRMF and Tomo-SRMF) with local interpolation methods (such as K-Nearest Neighbors).

Embodiments described herein further provide a unified method to accomplish several common analysis tasks on matrix-formed or tensor-formed digital information, such as estimation/inference (i.e., tomography), prediction, and anomaly detection.

Evaluation using real traffic matrices from three operational networks demonstrates that the approach of embodiments described herein has many desirable properties. Its performance when applied to real traffic matrices is excellent. It can reconstruct traffic matrices with up to half their data missing with errors of the order of 10%, and even when 98% of the data points are missing the approach of embodiments only has an error of the order of 30%. The technique of embodiment has been applied to matrices with over 700,000 entries, and can process these in only a few seconds. The algorithm of embodiments scales linearly with the size of the data so that much larger datasets can be analyzed. Moreover, tests of the approach of embodiments in applications such as network tomography, traffic prediction, and anomaly detection all confirm its effectiveness and robustness to real-world measurement issues.

BRIEF DESCRIPTION OF THE DRAWINGS

In the following description, for purposes of explanation, numerous specific details are set forth in order to provide a thorough understanding of an embodiment of the present disclosure. It will be evident, however, to one skilled in the art that the present disclosure may be practiced without these specific details. The present disclosure is illustrated by way of example and not limitation in the figures of the accompanying drawings, in which like references indicate similar elements and in which:

FIG. 2 shows a sample of interpolation performance results with respect to rank. Specifically.

FIG. 3 presents three examples showing the type of variability encountered over a range of values of $\lambda$, for three different loss rates and networks. Specifically.

FIG. 5 shows three cases of interpolation performance under different loss models. Specifically.

DETAILED DESCRIPTION OF THE INVENTION

Figure 1C:
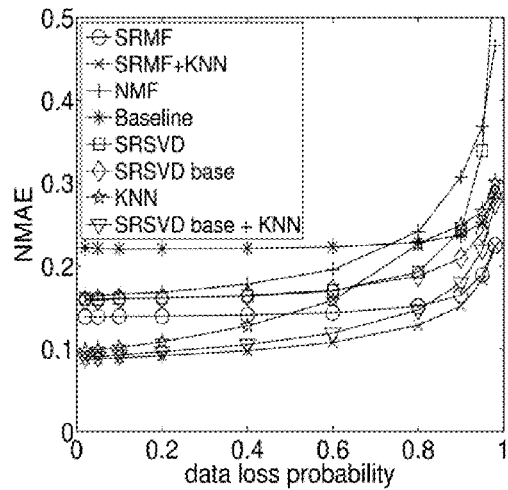
FIG. 1 shows a comparison of the interpolation performance of different algorithms for independent random loss for data loss rates ranging from 0.02 to 0.98 using data from Abilene (FIG. 1A), Commercial ISP (FIG. 1B), and GÉANT (FIG. 1C). Note that the legend is the same in all three plots.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein;

rather, these embodiments are provided so that this disclosure will satisfy applicable legal requirements. Like numbers refer to like elements throughout.

The reader of this disclosure is assumed to be familiar with the standard notations of linear algebra, in particular the notions of matrices (i.e., two-dimensional arrays), (column and row) vectors, matrix-vector product, matrix multiplication, and systems of linear equations (See G. H. Golub, C. F. Van Loan, *Matrix Computations*. Third edition. London: Johns Hopkins University Press (1996)). The required background may be obtained by reading books associated with college courses in linear algebra and/or matrix analysis.

The present invention broadly discloses a method and apparatus for allowing accurate reconstruction of missing values in any digital information represented in the form of a matrix (i.e., two-dimensional array) or more generally in the form of a tensor (i.e., multi-dimensional array). Examples of matrix-formed digital information may include: traffic matrix (which describes the volumes of traffic associated with different source-destination pairs in a network at different times), delay matrix (which describes the round-trip delays between nodes in a network), a social proximity matrix (which specifies the social proximity/closeness between users in a social network), a digital image (which specifies the color at different coordinates), a spatio-temporal signal (which specifies the value of the signal at different spatial locations and different times), and the like. One example of tensor-formed digital information is a digital video (which specifies the pixel at different X-Y coordinates at different times). The traffic matrix may also be naturally represented as a three-dimensional array (resulting in a tensor), with the three dimensions being source, destination, and time.

To help the reader better understand the present invention, traffic matrix is used as a concrete context for describing the present invention in this disclosure. However, the present invention is not so limited. Namely, the present invention can be applied in the context of reconstructing missing values in any digital information represented in the form of a matrix (i.e., two-dimensional array) or a tensor (i.e., multi-dimensional array), such as delay matrix, social proximity matrix, digital image, spatio-temporal signal, digital video, and the like.

1. THE PROBLEM: MISSING VALUE INTERPOLATION

Embodiments of the present invention as described herein allow accurate solutions to the general problem of missing value interpolation, i.e., reconstructing missing values in digital information represented in matrix or tensor form. As noted above, traffic matrix is used as the context for describing the problem hereinafter. Specifically, the following concepts will be first described before embodiments of the present invention are described in detail: (i) traffic matrix, (ii) missing values, and (iii) missing value interpolation.

1.1 Traffic Matrix

A Traffic Matrix (TM) is a non-negative matrix $Z(i,j)$ that describes volumes of traffic (in bytes, packets, or flows) between a source i and a destination j. For a network with N nodes the TM is a square N×N matrix. In practice, a TM is typically measured over some time interval, and the value reported is an average. So let $Z(i,j;t)$ be the traffic from i to j averaged over time interval $[t, t+\Delta t]$. Let TM $Z(t)$ be called a snapshot despite the fact that it really represents an interval. Therefore, the TM may be thought of as a 3-dimensional array $Z \in \mathbb{R}^N \times \mathbb{R}^N \times \mathbb{R}^m$ (where there are m time intervals present).

It is common to take a TM snapshot $Z(*, *, t)$ and stack the columns to form a column vector which is denoted by $x_t$. These vectors can then be compiled into the columns of a larger matrix $X \in \mathbb{R}^n \times \mathbb{R}^m$ (where $n=N^2$), and this form of the TM is often more convenient for algebraic manipulation than a 3-dimensional array. Note that the columns of X represent the TM at different times, while the rows represent the time evolution of a single element of the TM.

Note that TMs are critical inputs to many network engineering tasks, such as traffic engineering (See, Fortz et al. 2002, Roughan et al. 2003), capacity planning, and anomaly detection. Due to their importance, there is now a substantial body of work on TMs (See D. Alderson, H. Chang, M. Roughan, S. Uhlig, and W. Willinger, "The many facets of Internet topology and traffic," *Networks and Heterogeneous Media*, 1(4):569-600, 2006 (Alderson et al. 2006) and the references therein). The thrust of much of this research has been on measurement (See, A. Feldmann, A. Greenberg, C. Lund, N. Reingold, J. Rexford, and F. True, "Deriving traffic demands for operational IP networks: Methodology and experience," *IEEE/ACM Transactions on Networking*, pages 265-279, 2001 (Feldmann et al. 2001), G. Varghese and C. Estan, "The measurement manifesto," *Proc. of 2nd Workshop on Hot Topics in Networks (HotNets-II)*, 2003 (Varghese et al. 2003)) and inference (See, A. Medina, N. Taft, K. Salamatian, S. Bhattacharyya, and C. Diot, "Traffic matrix estimation: Existing techniques and new directions," *Proc. of ACM SIGCOMM*, 2002 (Medina et al. 2002), A. Soule, A. Lakhina, N. Taft, K. Papagiannaki, K. Salamatian, A. Nucci, M. Crovella, and C. Diot, "Traffic matrices: Balancing measurements, inference and modeling," *Proc. of ACM SIGMETRICS*, pages 362-373, 2005 (Soule et al. 2005), Q. Zhao, Z. Ge, J. Wang, and J. Xu, "Robust traffic matrix estimation with imperfect information: Making use of multiple data sources," *SIGMETRICS Perform. Eval. Rev.*, 34(1):133-144, 2006 (Zhao et al. 2006), Erramilli et al. 2006, Vardi 1996, Zhang et al. 2003a, Zhang et al. 2003b, Zhang et al. 2005a) of TMs, and more recently on topics such as anomaly detection (See, H. Ringberg, A. Soule, J. Rexford, and C. Diot, "Sensitivity of PCA for traffic anomaly detection," *Proc. of ACM SIGMETRICS*, 2007 (Ringberg et al. 2007), K. Xu, J. Chandrashekar, and Z.-L. Zhang, "A first step toward understanding inter-domain routing dynamics," *Proc. of ACM SIGCOMM Workshop on Mining Network Data (MineNet)*, pages 207-212, 2005 (Xu et al. 2005), Y. Zhang, Z. Ge, M. Roughan, and A. Greenberg, "Network anomography," *Proc. of Internet Measurement Conference (IMC)*, 2005 (Zhang et al. 2005b), Lakhina et al. 2004a, Lakhina et al. 2004b).

1.2 Missing Values

In practice it is challenging to reliably measure TMs for large networks for a number of reasons. First, in many networks the TM is not directly observable, and can only be estimated through link load measurements. Such measurements, while linearly related to the TM itself, are not sufficient to unambiguously identify the true TM. Typically, the problem was posed as an underconstrained linear-inverse problem, where the solution relied on a prior model of the TM, e.g., the Poisson model (See Vardi 1996), the gravity model (See, Zhang et al. 2003a, Zhang et al. 2005a), or the independent flow model (See Erramilli et al. 2006). Second, although many networks now collect (sampled) flow-level measurements for at least part of their network, there are still serious impediments to reliable large-scale collection of TMs: data collection systems can fail, flow collectors often use an unreliable transport protocol, and legacy network components may not support flow collection or be resource challenged. Third, scalability requirements may mean that flow-level collection doesn't occur at the edge of a network (which would be necessary for true TM recovery (See Feldmann et al. 2001)), but often only on some subset of the routers. Recovery of the actual ingress-egress TM from such data is non-trivial. Finally, when an anomaly is found in a set of TMs, it is often important to know the non-anomaly-related traffic either for other network tasks, or just to infer the cause of the anomaly. The result is that any large set of TM measurements has some, and quite often, a significant number of missing values.

Note that even when past TM measurements are complete, many network engineering tasks (such as capacity planning, survivability analysis, and traffic engineering) often require predicting TMs in the future. Future TMs are of course missing from the set of past TM measurements, because they have not yet appeared. Therefore, TM prediction can be viewed as a special instance of the problem of reconstructing missing values in a TM.

1.3 Missing Value Interpolation

Since many network engineering tasks that require TMs are either intolerant or highly sensitive to missing data, it is important to accurately reconstruct missing values based on partial and/or indirect TM measurements. Interpolation is the mathematical term for filling in these missing values. In the rest of this disclosure, the terms "interpolation" and "reconstruction" will be used interchangeably.

One example of the above missing value interpolation problem is also known as the network tomography problem (See Vardi 1996). In this problem the TM X is related to the more easily measured link loads Y by the following linear matrix equation $$Y = AX, \quad (1)$$

where A is the routing matrix, which expresses which links are used by which routes (more specifically, each entry A[e,p] expresses the probability for traffic associated with source-destination pair p to traverse link e). TM tomography involves finding the "best" solution $\hat{X}$ to (1) given a set of link-load measurements Y.

More generally, additional TM measurement strategies may be combined with link measurements, which often yield a better estimate of the TM than using each individual type of measurements by itself (See Zhao et al. 2006). For example, flow-records are typically collected at ingress routers (See Feldmann et al. 2001). In this case, each router sees one row of a TM snapshot, so over time, router i sees Z(i, *, *). Missing data from a single router means missing a row of Z, or a group of rows of X. Flow-records could also be collected at egress or backbone routers. In this case, although it may be difficult to unambiguously determine the ingress router for the observed traffic, the additional measurements may still be captured by forming a set of linear constraints on where the traffic could have originated. An alternative measurement strategy (See, Varghese et al. 2003, Zhang et al. 2005a) is to collect local TMs at each router, which can again be represented as linear constraints on the global TM.

In combination, all these measurement strategies can be captured using a set of linear constraints on the TM, i.e., $$\mathcal{A}(X) = B, \quad (2)$$

where $\mathcal{A}(\cdot)$ is a linear operator, and the matrix B contains the measurements. The operator expresses the information available in the measurements.

Note that the presence of missing data is implicit in (2); for instance, the operator A may include TM measurements at ingress routers with no measurement errors (but with missing data), by writing (2) as $$M \bullet^* X = M \bullet^* D, \quad (3)$$

where D(i,j) contains the direct measurements (where available) and M is a $N^2 \times m$ matrix given by $$M(i, j) = \begin{cases} 0, & \text{if } X(i, j) \text{ is missing,} \\ 1, & \text{otherwise.} \end{cases} \quad (4)$$

and $\bullet^*$ denotes an element-wise product, i.e., $A = C \bullet^* B$ means $A(i,j) = B(i,j) C(i,j)$. When both link measurements and direct measurements are available, then constraints (3) will (typically) be incorporated into (2) to simplify notation.

The goal of missing value interpolation is to find an estimated TM $\hat{X}$ that satisfies the conditions imposed by the set of measurements, i.e., Equation (2). However, as is the case in many such linear-inverse problems, there may not be enough information to unambiguously determine X. These problems are called undetermined linear-inverse problems (in the case of TM estimation from link data, the problem is very highly underconstrained).

2. THE INVENTION: SPATIO-TEMPORAL COMPRESSIVE SENSING

Embodiments of the present invention provide a general method and apparatus called "spatio-temporal compressive sensing" that allows accurate reconstruction of missing values in digital information represented in matrix or tensor form. The approach of embodiments as described hereinafter, comprises the following three main components: (i) SPARSITY REGULARIZED MATRIX FACTORIZATION (SRMF)—a method for obtaining a low-rank approximation to the data of interest that is consistent with both measurements and knowledge about the spatio-temporal structure of the data, (ii) a method for enforcing measurement constraints while staying close to the low-rank solution obtained by SRMF, and (iii) a method for combining low-rank approximation with local interpolation.

2.1 Sparsity Regularized Matrix Factorization (SRMF)

Since many real-world signals or datasets exhibit some structure or redundancy (i.e., they are not pure noise), it may be possible to utilize this prior knowledge for both acquisition and reconstruction of the signal or dataset at hand. Structure and redundancy in data are often synonymous with sparsity. A sparse vector is simply a vector that has only a few non-zero elements. In the context of matrices, low rank is analogous to sparsity, because the spectrum formed by the singular values of a low-rank matrix is sparse (see below). It is now well known that TMs may be approximated by matrices of low rank (See, Lakhina 2004a, Lakhina 2004b), and so this concept fits well here. Therefore, embodiments of the present invention explicitly use this type of sparsity as the approach to resolve the underconstrained nature of the missing value interpolation problems.

In one embodiment, SPARSITY REGULARIZED MATRIX FACTORIZATION (SRMF) seeks to solve the original missing value interpolation problem in (2) by obtaining a low-rank approximation to the TM:

$$X \approx LR^T,$$

where X is the TM of interest (of size m×n), L is the left factor matrix (of size m×r), R is the right factor matrix (of size m×r), $R^T$ denotes the transpose of matrix R, and r is an upper bound on the rank of the low-rank approximation (i.e., $LR^T$).

According to one embodiment, the two factor matrices L and R may be obtained by solving the following optimization problem:

$$\text{minimize}_{L,R} \|A(LR^T)-B\|_F^2 + \lambda \cdot (\|L\|_F^2+\|R_F^2)+\| C(LR^T)\|_F^2 \quad (5)$$

Here $\|\cdot\|_F$ denotes the Frobenius norm, with $\|Z\|_F \triangleq \sqrt{\Sigma_{i,j}Z(i,j)^2}$ for any matrix Z. Thus, $\|A(LR^T)-B\|_F^2$ quantifies the total violation of the measurement constraints given by (2). The regularization term $\lambda \cdot (\|L\|_F^2+\|R\|_F^2)$ captures the complexity of the resulted low-rank approximation, where $\lambda$ is a regularization parameter. $\|C(LR^T)\|_F^2$ captures the spatio-temporal structure among elements of X (e.g., temporally nearby TM elements have similar values), where $C(\bullet)$ can be any linear operator. Therefore, the objective of (5) simultaneously capture the desire to (i) minimize the violation of the measurement constraints, (ii) have the simplest low-rank approximation model (i.e., $X \approx LR^T$), and (iii) exploit the spatio-temporal structure of X.

In order to solve (5) to derive L and R, an alternating least squares procedure may be used. Specifically, L and R are initialized randomly. The above optimization is then solved by taking one of L and R to be fixed and the other to be the optimization variable (which is a standard linear least squares problem). The roles of L and R are then swapped, and the procedure continues alternating towards a solution till convergence. According to one embodiment, implementation of the alternating least squares procedure may further utilize sparse matrix operations to minimize memory requirement and maximize speed. The above approach will be referred to as SPARSITY REGULARIZED MATRIX FACTORIZATION (SRMF) interpolation.

2.1.1 Examples of SRMF

The methods of embodiments described above allow different choices of the linear operator $C(\bullet)$ in (5). An exemplary configuration of the linear operator $C(\bullet)$ is $$C(Z) = \text{concat}(\text{vectorize}(SZ), \text{vectorize}(ZT^T))$$

where Z is any matrix, function vecterize ($\bullet$) stacks all columns of a matrix into a single vector, function concat($\bullet$, $\bullet$) concatenate two column vectors, S and T are the spatial and temporal constraint matrices, respectively. Matrices S and T express domain knowledge about the spatio-temporal structure of the TM (e.g., temporally nearby TM elements have similar values).

With the above exemplar choice of $C(\bullet)$, the optimization problem in (5) becomes the following equivalent optimization problem, according to one embodiment:

$$\text{minimize}_{LR} \|A(LR^T)-B\|_F^2 + \lambda \cdot (\|L\|_F^2+\|R\|_F^2) + \|S(LR^T)\|_F^2 + \|(LR^T)T^T\|_F^2 \quad (6)$$

A variety of possibilities exist on the choices of S and T. To better illustrate the idea and benefit of SRMF, the discussions below intentionally use relatively simple choices of S and T as examples. It is important to understand that these discussions are by way of example only, not limitation. One skilled in the art should easily be able to better tailor S and T to different dataset characteristics and application requirements.

(a) Choice of Temporal Constraint Matrix T:

The temporal constraint matrix T captures the temporal smoothness of the TM. A simple choice for the temporal constraint matrix is T=Toeplitz(0, 1, −1), which denotes the Toeplitz matrix with central diagonal given by ones, and the first upper diagonal given by negative ones, i.e., $$T = \begin{bmatrix} 1 & -1 & 0 & \cdots \\ 0 & 1 & -1 & \ddots \\ 0 & 0 & 1 & \ddots \\ \vdots & \ddots & \ddots & \ddots \end{bmatrix} \quad (7)$$

This temporal constraint matrix intuitively expresses the fact that TMs at adjacent points in time are often similar. For instance $XT^T$ is just the matrix of differences between temporally adjacent elements of X. By minimizing $\|(LR^T)T^T\|_F^2$ the method seeks an approximation that also has the property of having similar temporally adjacent values.

Another simple choice of temporal constraint matrix is: T=Toeplitz(0, 1, −2, 1), which denotes the Toeplitz matrix with central diagonal and second upper diagonal given by ones, and the first upper diagonal given by negative twos, i.e., $$T = \begin{bmatrix} 1 & -2 & 1 & 0 & \cdots \\ 0 & 1 & -2 & 1 & \ddots \\ 0 & 0 & 1 & -2 & \ddots \\ 0 & 0 & 0 & 1 & \ddots \\ \vdots & \ddots & \ddots & \ddots & \ddots \end{bmatrix} \quad (8)$$

This temporal constraint matrix intuitively expresses the fact that the TM at time t can be well approximated as the average of the TM at time (t−1) and the TM at time (t+1).

A more sophisticated choice taking into account domain knowledge (say knowledge of the periodicity in traffic data) might result in some improvements. Such an example will be given for traffic prediction later in this disclosure. In general, it may not be difficult to develop such temporal models of TMs.

(b) Choice of Spatial Constraint Matrix S:

The spatial constraint matrix S may express which rows of a TM have values that are close to each other, but due to the arbitrary ordering of rows in the TM, a simple matrix of the above form may not be appropriate. In one possible embodiment of the present invention, S may be found by first obtaining an initial TM estimate $\dot{X}$ using a simple interpolation algorithm, and then choosing S based on the similarity between rows of $\dot{X}$ (which approximates the similarity between rows of X). Specifically, it takes the following three steps to obtain S, according to one embodiment:

Step 1. Computing a baseline approximation to X (denoted by $X_{base}$). In one embodiment, $X_{base}$ is computed using variables described in Table 1. In matrix form, $X_{base}$ can be represented as a rank-2 approximation to X: $X_{base} = \overline{X} + X_{row} 1^T + 1XL_{col}^T$, where 1 is a column vector consisting of all ones. The regularized least-squares algorithm from R. Bell, Y. Koren, and C. Volinksy, "Chasing the $1,000,000: How we won the Netflix progress prize," *Statistical Computing and Graphics*, 18(2), 2007 (Bell et al. 2007) may be used to compute $\overline{X}$, $X_{row}$, $X_{col}$ from input $A(\bullet)$ and B. That is, solve the following $$\text{minimize} \|\mathcal{A}(\overline{X}+X_{row}1^T+1X_{col}^T)-B\|_F^2 + \lambda(\overline{X}^2+\|X_{row}\|_F^2+\|X_{col}\|_F^2). \quad (9)$$

where $\lambda$ is a regularization parameter. The first term in this formulation minimizes the Frobenius norm of the difference $A(X_{base})-B$, and the second regularization term helps avoid overfitting.

TABLE 1

Outputs of baseline estimation.

| variable | description |
|---|---|
| $\overline{X}$ | an estimate of the mean of X over all i and j. |
| $X_{row}$ | a vector of length m such that $X_{row}(i)$ = an estimate of $\Sigma_j(X(i,j) - \overline{X})/n$. |
| $X_{col}$ | a vector of length n such that $X_{col}(j)$ = an estimate of $\Sigma_i(X(i,j) - \overline{X})/m$. |
| $X_{base}$ | the baseline estimate for X given by $X_{base}(i,j) = \overline{X} + X_{row}(i) + X_{col}(j)$. |

Step 2. Computing $\dot{X}$. In one possible embodiment, $\dot{X}$ is set to be $$\dot{X} = X_{base} \bullet *(1-M) + D \bullet *M,$$

where M is defined in (4) and specifies which TM elements are directly measured, and D contains the direct measurements. That is, direct measurements are used where available, and interpolation using $X_{base}$ is used at other points.

Step 3. Choosing S based on $\dot{X}$. There are many possible methods for choosing S based on $\dot{X}$. For example, according to one possible embodiment, a general class of methods is to (i) construct a weighted graph G, where each node represents a row of $\dot{X}$ and each edge weight represents certain similarity measure between two rows of $\dot{X}$, and (ii) set S to be the normalized Laplacian matrix (See F. R. K. Chung, *Spectral Graph Theory*. CBMS Lecture Notes. AMS Publications, 1996 (Chung 1996)) of graph G, which acts as a differencing operator on G and induces sparsity by eliminating redundancy between similar nodes of G (i.e., rows of $\dot{X}$). Several methods of this class have been implemented and tested using real TM datasets. The following method for choosing S based on linear regression consistently yields good performance in the tests, which will be used in experimental evaluation. For each row i of $\dot{X}$, the method of embodiments finds the K most similar rows $j_k \neq i$ (k=1, . . . , K). The method then performs linear regression to find a set of weights w(k) such that the linear combination of rows $j_k$ best approximates row i: $\dot{X}(i,*) \approx \Sigma_{k=1}^{K} w(k) \dot{X}(j_k,*)$. Assuming that $\Sigma_{k=1}^{K} w(k) X(j_k,*)$ approximates X(i,*) well, the method then sets S(i,i)=1 and $S(i,j_k)$=w(k) for k=1, 2, . . . , K to capture the resulting approximation errors (which are expected to be small).

(c) Scaling of S and T:

Finally, according to one embodiment, S and T may be further scaled so that $\|S(LR^T)\|_F, \|(LR^T)T^T\|_F$, and $\|A(LR^T)-B\|_F$ are of similar order of magnitude. Such scaling may prevent the three penalty terms from overshadowing each other during the optimization of (6). In experimental evaluation, according to one embodiment, S and T are simply scaled such that $\|S\dot{X}\|_F = 0.1\sqrt{\lambda}\|B\|_F$ and $\|\dot{X}T^T\|_F = \sqrt{\lambda}\|B\|_F$, where $\sqrt{\lambda}\|B\|_F$ reflects the level of approximation error $\|A(LR^T)-B\|_F$ that one is willing to tolerate. The evaluation results show that such scaling yields good performance over a wide range of scenarios and that the performance is not sensitive to the choice of $\lambda$. Note that $\|S\dot{X}\|_F$ is intentionally made smaller than $\|\dot{X}T^T\|_F$ because the temporal model obtained through domain knowledge is expected to be more reliable.

2.1.2 Extension of SRMF to Handle Data Represented in Tensor Form

The methods of embodiments as described above so far implicitly assume that the digital information of interest (i.e., X) is represented in the form of a matrix (i.e., two-dimensional array). However, the methods of embodiments can extend naturally to handle any digital information X represented in the form of a tensor, i.e., a d-dimensional array (with 1). More specifically, similar to the matrix version of SRMF, the tensor version of SRMF seeks a low-rank approximation to tensor X in the following form:

$$X \approx TP(F_1, F_2, \ldots, F_d),$$

where X is the digital information represented as a d-dimensional array (with size $m_1 \times m_2 \times \ldots m_d$), $F_k$ is the factor matrix associated with the k-th dimension (with size $m_1 \times r$), r is an upper bound on the desired rank of the low-rank approximation, and TP( . . . ) represents the tensor product operator—specifically, let P be the tensor product of all the factor matrices $F_k$, i.e., P=TP($F_1, F_2, \ldots, F_d$), then P is defined as a d-dimensional tensor of size $m_1 \times m_2 \times \ldots m_d$ whose entries are specified by:

$$P(i_1, i_2, \ldots, i_d) = \sum_{c=1}^{r} \left( \prod_{k=1}^{d} F_k(i_k, c) \right)$$

According to one embodiment of the present invention, the tensor version of SRMF may derive the factor matrices $F_k$ by solving the following optimization problem:

$$\text{minimize}_{\{F_k\}} \|A(TP(F_1, \ldots, F_d))-B\|_F^2 + \lambda \cdot (\|F_1\|_F^2 + \ldots + \|F_d\|_F^2 + \ldots + \|F_d\|_F^2) + \| C(TP(F_1, \ldots, F_d))\|_F^2 \quad (10)$$

Here $\|\bullet\|_F$ denotes the Frobenius norm, $\|Z\|_F = \sqrt{\Sigma_{i_1,i_2,\ldots i_d} Z(i_1,i_2,\ldots i_d)^2}$ for any d-dimensional tensor Z. Thus, $\|A(TP(F_1, \ldots, F_d))-B\|_F^2$ quantifies the total violation of the measurement constraints given by (2). The regularization term $\lambda \cdot (\|F_1\|_F^2 + \ldots + \|F_d\|_F^2)$ captures the complexity of the resulted low-rank approximation, where $\lambda$ is a regularization parameter. $\|C(TP(F_1, \ldots, F_d))\|_F^2$ captures the spatio-temporal structure among elements of X (e.g., temporally nearby TM elements have similar values), where C($\bullet$) can be any linear operator. Therefore, similar to (5), Equation (10) simultaneously captures the desire to (i) minimize the violation of the measurement constraints, (ii) have a low-rank approximation with low model complexity, and (iii) exploit the spatio-temporal structure of X.

2.2 Enforcing Measurement Constraints

In many applications, it is desirable to ensure that the measurement constraints given in (2) are enforced. However, the low-rank approximation obtained by SRMF may not satisfy the measurement constraints due to either measurement noise or the fact that the real X may not be exactly low-rank (i.e., it may be impossible to represent X as the matrix product of two factor matrices L and R, where both L and R have only r columns).

The present invention provides a general method for better enforcing the measurement constraints. Specifically, the method uses the low-rank approximation obtained by SRMF as a prior solution. The method of embodiments then seeks a solution that is close to this prior solution (with respect to some distance function) yet satisfies all the measurement equations. The resulting method is called Tomo-SRMF, because it incorporates SRMF while enforcing the tomography constraints (2). Standard convex programming techniques can be applied to solve the resulting optimization problem.

In one possible embodiment, Tomo-SRMF involves solving the following optimization problem:

$$\text{minimize}_X J(X, LR^T) \text{ subject to } A(X)=B \quad (11)$$

where J(X, Y) is a penalty functional that quantifies the distance between two matrices X and Y Multiple choices of J( . . . ) are possible. As an example, it is possible to set $J(X,Y)=\|X-Y\|_F^2$. As another example, the Kullback-Liebler divergence (See D. D. Lee and H. S. Seung, "Algorithms for non-negative matrix factorization," *Proc. of Neural Information Processing Systems (NIPS)*, pages 556-562, 2000 (Lee et al. 2000)) can be used as the penalty functional.

In practice, the measurements often contain noise. In this case, it may not be possible to satisfy the measurement constraints (2) exactly. A possible embodiment of Tomo-SRMF that can cope with measurement noise is to solve the following optimization problem:

$$\text{minimize}_X \|A(X)-B\|_F^2 + \alpha \cdot J(X, LR^T) \quad (12)$$

where α is a regularization parameter.

It is possible for Tomo-SRMF to also incorporate knowledge about the spatio-temporal property of the data at the same time. Specifically, a possible embodiment of Tomo-SRMF is to solve the following optimization problem:

$$\text{minimize}_X \|A(X)-B\|_F^2 + C(X)\|_F^2 + \alpha \cdot J(X, LR^T) \quad (13)$$

where C(•) is a linear operator that expresses knowledge about the spatio-temporal property of X. In this way, the resulting solution will stay close to the low-rank prior, while account for constraints for both the measurements and domain knowledge about the spatio-temporal property of the data.

Note that to make it easier for the reader to understand the present invention, only embodiments of the matrix version of Tomo-SRMF are described above. However, the present invention is not so limited. Namely, extensions similar to those described in Section 2.1.2 can be practiced by one skilled in the art to enforce measurement constraints when the digital information of interest is represented in the form of a d-dimensional array (i.e., a tensor).

2.3 Combining Global and Local Interpolation

Both SRMF and Tomo-SRMF can effectively capture the global structure present in the digital data of interest, such as the (approximately) low-rank nature and the spatio-temporal smoothness. The present invention also provides methods to further take advantage of local structure and redundancy present in the TM by augmenting SRMF or Tomo-SRMF with an additional local interpolation procedure.

As an illustrative example, it is possible to combine SRMF with K-Nearest Neighbors (KNN) to obtain a hybrid algorithm called SRMF+KNN. In one embodiment, SRMF+KNN first computes the SRMF interpolation of X (denoted by $X_{SRMF}$). For each missing data point (i,j), the method of the embodiment then examines its row to see if any of the elements X(i,j−3), . . . , X(i,j+3) are present. If none of these neighbors is directly observed, then the method of the embodiment simply uses the value $X_{SRMF}(i,j)$, but if any of these values is available, the method of the embodiment will use them to better approximate X(i,j).

Better approximation to X(i,j) can be achieved by forming a local model for the temporal process using all of the other rows of the TM, according to one embodiment. Specifically, a regression can be performed to find a set of weights w(k) that best approximates $X_{SRMF}(p,j)=\Sigma_{k \in nbrs} w(k) X_{SRMF}(p,k)$ for all p=1, 2, . . . , n. Then the method of embodiments applies a weighted linear interpolation of the nearest neighbors, using the weights derived above, i.e., $$X_{SRMF+KNN}(i,j) = \sum_{k \in nbrs} w(k) X(i,k). \quad (14)$$

3. ILLUSTRATIVE RESULTS ON INTERPOLATION PERFORMANCE

This section uses real TM data to illustrate the performance of the present invention.

3.1 Dataset Description

The data used here is real TM data: two standard sets, and one new set. The first two are the Abilene (Internet2) dataset used previously in various studies (See, Lakhina et al. 2004a, Lakhina et al. 2004b, Zhang et al. 2005b), and the GÉANT TM dataset (See S. Uhlig, B. Quoitin, S. Balon, and J. Leppropre, "Providing public intradomain traffic matrices to the research community," *ACM SIGCOMM CCR*, 36(1):83-86, 2006 (Uhlig et al. 2006)) previously examined in Alderson et al. 2006. Although these are now older datasets, they are used because they are valuable for comparisons with other work. In addition, one longer and more recent commercial TM dataset from a large Internet service provider is used in the evaluation below. The properties of the data are summarized in Table 2.

TABLE 2

Datasets under study.

| Network | Date | Duration | Resolution | Size |
|---|---|---|---|---|
| Abilene | April 2003 | 1 week | 10 min. | 121 × 1008 |
| Commercial | October 2006 | 3 weeks | 1 hour | 400 × 504 |
| GÉANT | April 2005 | 1 week | 15 min. | 529 × 672 |

3.2 Algorithms Compared

The evaluation described hereafter compares the following eight different algorithms for missing value interpolation in the TM.

SRMF:

This is the solution obtained by solving optimization problem (6).

Baseline:

This is the baseline approximation $X_{base}$ given by (9)

SRSVD:

As an extreme example of SRMF, it is possible to simply set C(Z)=0. This implies no spatio-temporal property is used. The resulting optimization problem is $$\text{minimize}_{L,R} \|A(LR^T)-B\|_F^2 + \lambda \cdot (\|L\|_F^2 + \|R\|_F^2) \quad (15)$$

This solution regularizes towards the low-rank approximation but does not strictly enforce the measurement equations. The regularization parameter λ allows a tunable tradeoff between a precise fit to the measured data and the goal of achieving low rank. The above approach is closely related to singular value decomposition (SVD) and will be referred to as Sparsity Regularized SVD (SRSVD) interpolation. When the original data X is exactly low-rank, it has been shown in matrix compressive sensing literature (See, Candes et al. 2009, Recht et al. 2007, Recht et al. 2008) that when a certain technical condition (the restricted isometry property (See Recht et al. 2007)) holds on A(•), SRSVD can recover X exactly for a matrix of low enough rank.

SRSVD-Base:

In this approach, the baseline approximation $X_{base}$ is used to center the measurements. SRSVD is then applied to the centered data (X−$X_{base}$). This approach will be referred to as SRSVD-base.

Nonnegative Matrix Factorization:

Nonnegative Matrix Factorization (NMF) (See Lee et al. 2000) tries to find nonnegative factor matrices L and R that minimize the Frobenius norm of the difference A(LR^T)−B over the observations. The approach is very similar to the SVD, except for the insistence on non-negative factor matrices. Overfitting is avoided by regularizing in the same manner that for SVD, i.e., solve (12) but with the additional constraint of non-negativity. The evaluation implements the two most common algorithms for NMF: multiplicative update (See Lee et al. 2000) and alternating nonnegative least squares. Both algorithms were designed for the case where the matrix X is completely known. So the evaluation extends them to further cope with measurement equations (2). The two algorithms give similar interpolation performance, but multiplicative update is more efficient. So the results are based on this algorithm.

K-Nearest Neighbors (KNN):

A completely different approach is also tested: k-Nearest Neighbors (KNN). Simple nearest neighbors directly uses the nearest neighbor of a missing value for interpolation. KNN extends this by using a weighted average of the k nearest-neighbors' values. The approach described in Bell et al. 2007 is used to determine the weights.

SRMF+KNN:

This is the hybrid algorithm that combines SRMF with K-Nearest Neighbors (as described in Section 2.3).

SRSVD-Base+KNN:

Finally, to assess the importance of incorporating spatio-temporal information, the evaluation also considers a hybrid algorithm that combines SRSVD-base with K-Nearest Neighbors. This approach is referred to as SRSVD-base+KNN.

Among the above eight algorithms, SRMF and SRMF+KNN represent possible embodiments of the present invention.

3.3 Evaluation Methodology

The evaluation methodology used here is to drop some data from existing measurements, and then apply the interpolation algorithm. This provides the ground truth for comparison. The pseudo-missing data is not used in the interpolation algorithms in any way.

The typical approach when measuring the performance of an interpolation algorithm is to drop data at random. The experiments will start with this case. However, in real measurements of TMs there are different mechanisms that result in missing data, and these result in the missing data having structure. Such structure is obviously important for interpolation, so the evaluation will explore several structured models of missing data in Section 4.5 below.

The interpolation performance is measured using the Normalized Mean Absolute Error (NMAE) in the interpolated values. Specifically, the NMAE is calculated as:

$$NMAE = \frac{\sum_{i,j:M(i,j)=0} |X(i,j) - \hat{X}(i,j)|}{\sum_{i,j:M(i,j)=0} |X(i,j)|}, \quad (16)$$

where $\hat{X}$ is the estimated matrix. Note that only errors on the missing values are measured. So the NMAE is defined only when there is at least one missing value. The evaluation also examines three other performance metrics (root mean squared error, normalized root mean squared error, and the correlation-coefficient) but the results are substantively the same. In each case the process of randomly dropping data and reconstructing the matrix is performed 10 times. The results presented show the mean NMAE.

3.4 Initial Comparisons

Figure 1C:
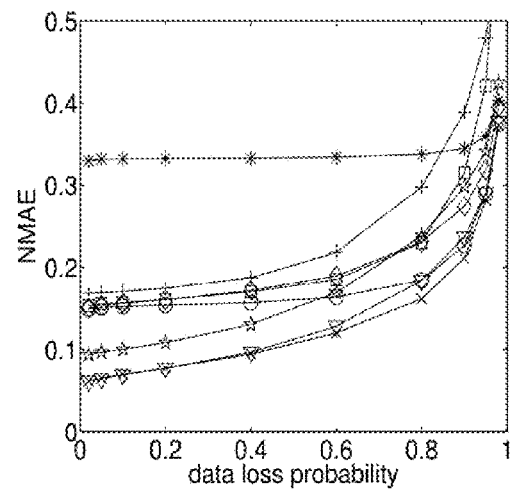
Figure 1C:
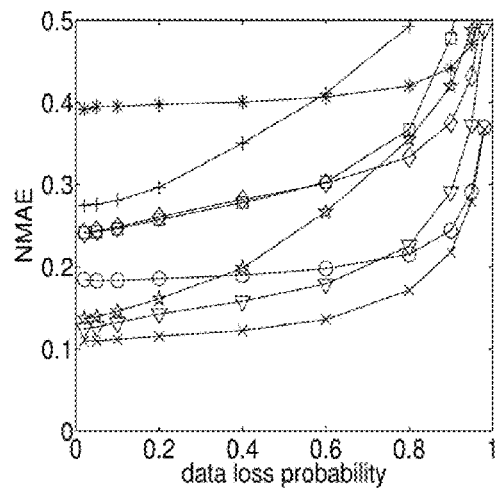

FIG. 1 shows a comparison of algorithms for independent random loss for data loss rates ranging from 0.02 to 0.98 (NMAE is undefined when the loss probability is 0) using TM data collected from Abilene (FIG. 1A), Commercial ISP (FIG. 1B), and GÉANT (FIG. 1C). These algorithms are performed using the same regularization and input rank parameters $\lambda=0.1$ and $r=8$ for each global algorithm, and $k=4$ in KNN (justification of these choices will be deferred to the section below).

For low loss probabilities KNN achieves better performance than SRMF. For high loss probabilities, it is evident that SRMF's performance exceeds KNN. However, the hybrid SRMF+KNN outperforms all algorithms over the whole range of loss values. Interestingly, the hybrid is noticeably better than either method individually.

Meanwhile, the hybrid SRSVD-base+KNN also performs well, though not as well as SRMF+KNN. The performance gap typically widens for large amounts of loss. This is because under independent random loss, when the loss rate is not too high, it is likely that the near neighbors of a missing value are directly observed, making KNN an effective recovery strategy. However, when loss is large or when the loss is highly structured (see Section 3.6), the performance gap between SRSVD-base+KNN and SRMF+KNN widens.

The other methods all have worse performance. For low loss, the baseline method is the worst (as one might expect given it is only a rank-2 approximation). However, for high loss, the baseline performs surprisingly well, certainly better than SRSVD, whose performance is very bad for high loss. However, the SRSVD applied after baseline removal achieves reasonable performance over the whole loss range, in some cases almost as good as the simple SRMF. NMF performs poorly for all loss probabilities.

Many such graphs have been examined. NMF and SRSVD (without baseline removal) are uniformly poor. So they will not be examined in further results to simplify the presentation.

3.5 Parameter Sensitivity and Settings

The algorithms considered have several input parameters. The performance of these algorithms in relation to these parameters is (in most cases) dependent on the dataset in question. In practice, when interpolating a real dataset, it may not be possible to precisely optimize λ and r for the dataset in question, so it is desirable to have algorithms that are not very sensitive to their values. In fact, all algorithms display some dependence on the parameter settings, and no single parameter setting is optimal for all datasets. However, the evaluation identifies rough parameter settings that are never too far from optimal.

The first input parameter is the rank. In theory, as long as the input rank is greater than the real rank of x, the various algorithms will converge to the correct matrix (See, Candes et al. 2009, Recht et al. 2007, Recht et al. 2008). However, note that the theoretical results that inform the intuition here concern matrices with exact ranks, whereas real TMs typically have a number of small, but non-zero singular values. Moreover, there are measurement errors in the data, so one should not expect to get zero error reconstructions.

Figure 2A:
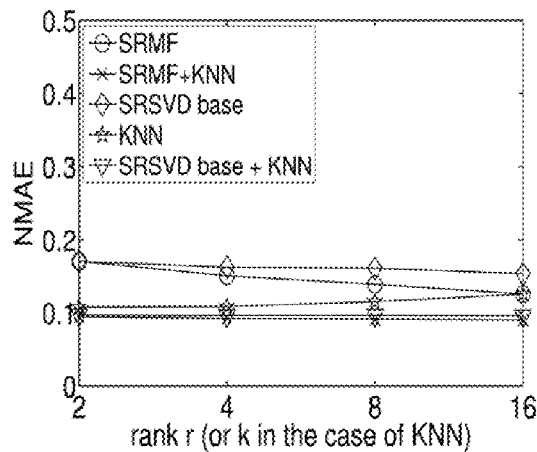
FIG. 2A shows the results for Abilene, with a loss rate of 0.2.
Figure 2B:
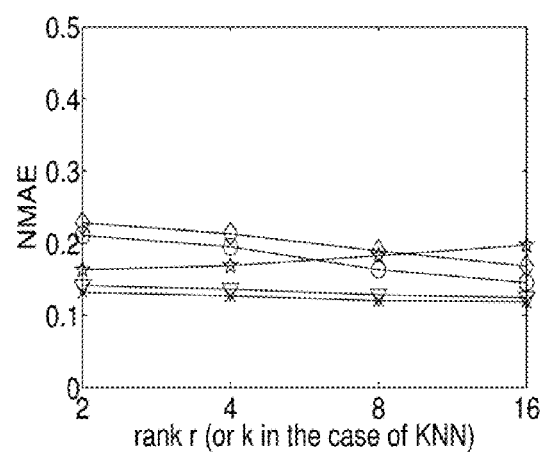
FIG. 2B shows the results for the Commercial ISP, with a loss rate of 0.6.
Figure 2C:
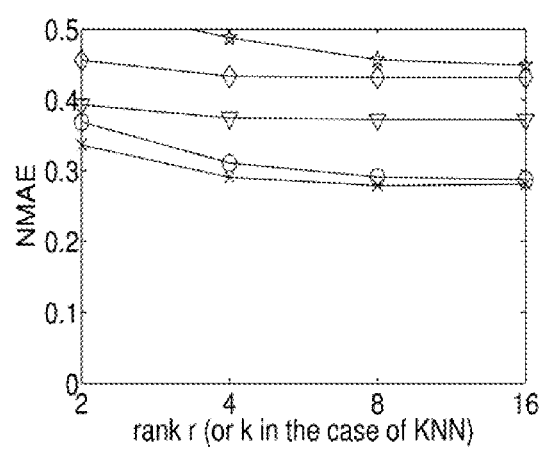
FIG. 2C shows the results for GÉANT, with a loss rate of 0.95.

FIG. 2 shows a sample of performance results with respect to rank (note that the baseline algorithm is excluded here because it is a fixed rank-2 approximation). Specifically, FIG. 2A shows the results for Abilene, with loss probability set to 0.2; FIG. 2B shows the results for the Commercial ISP, with loss probability set to 0.6; FIG. 2C shows the results for GÉANT, with loss probability set to 0.95. The results show that most of the rank-dependent methods have better performance as the input rank increases. Although this is not always the case, the deviations are minor. However, note the logarithmic x-axis, so that the results suggest a decrease in the marginal improvement with increasing rank. There is also an additional computational cost for higher ranks, and the results show that an input rank of r=8 is a reasonable operating point for comparisons. Going to r=16 yields only a very small incremental improvement at the expense of extra computation.

The most important finding in these results, however, is the relative insensitivity of the hybrid algorithm, SRMF+KNN. In general it is the least dependent on the input rank of all the algorithms. There is some improvement for higher ranks, but it is typically smaller than those of other algorithms.

KNN does not use input rank, but rather k, the size of neighborhood. FIG. 2 also shows the effect of k on the performance of KNN. k=4 is used for the remaining experiments, since it consistently avoids the worst results.

Figure 3A:
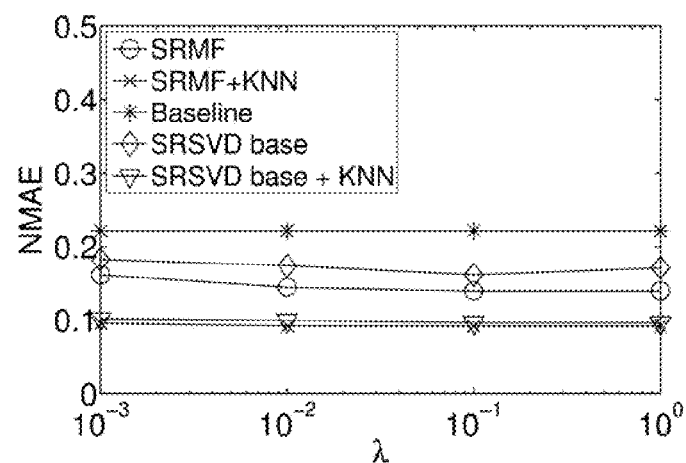
FIG. 3A shows the results for Abilene, with a loss rate of 0.2.
Figure 3B:
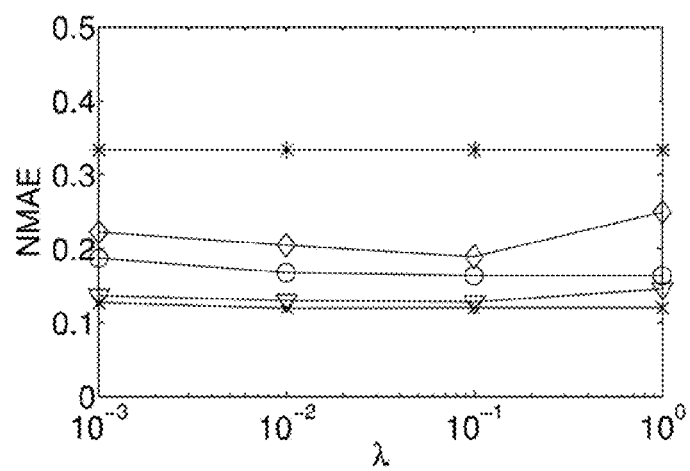
FIG. 3B shows the results for the Commercial ISP, with a loss rate of 0.6.
Figure 3C:
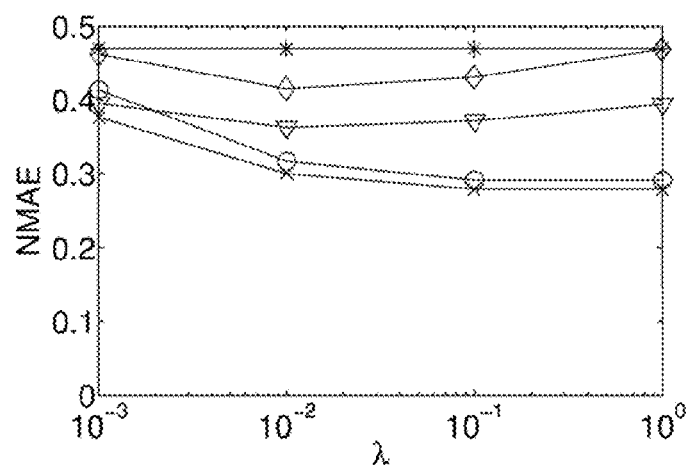
FIG. 3C shows the results for GÉANT, with a loss rate of 0.95. Note that the legend is the same in all three plots.

The final parameter of importance is the regularization parameter $\lambda$, which determines the tradeoff (in the optimization) between the measurement constraints and the importance of rank. Larger $\lambda$ leads to lower rank approximations, whereas smaller values lead to approximations that are a better fit to the data. FIG. 3 presents three examples showing the type of variability encountered over a range of values of $\lambda$, for three different loss rates and networks. Specifically, FIG. 3A shows the results for Abilene, with loss probability set to 0.2; FIG. 3B shows the results for the Commercial ISP, with loss probability set to 0.6; FIG. 3C shows the results for GÉANT, with loss probability set to 0.95. KNN is omitted because it does not use regularization. Once again note the logarithmic x-axis—the evaluation looks for order of magnitude effects here, not fine tuning None of the techniques is too sensitive. Among them, SRSVD is the most sensitive (overall). Larger values of $\lambda$ typically perform better although again sometimes this trend is reversed, and there are a number of cases where the optimal case is around $\lambda$=0.1. So this value is used in the experiments.

Note again that SRMF+KNN is the most insensitive algorithm with FIG. 3C showing the most extreme case of parameter sensitivity observed for this algorithm.

3.6 Comparison: Other Loss Models

As earlier noted, not all data loss is random. Losses are often highly structured, and this section examines the effect this has on the results. The boldface name denotes the label used in the datasets, where xx is replaced by the percentage of rows (or columns) effected.

PureRandLoss:

This is the simple random loss model. Data points in the matrix X are dropped independently at random with probability q.

xxTimeRandLoss:

This simulates a structured loss event where data loss occurs at certain times. For example at a certain time point the monitoring equipment might become overloaded, or a disk might fills up. In these cases, some random proportion of the data may be lost at a particular point in time. This loss is simulated by choosing, at random xx % of the columns of x, and dropping data from these at random with probability q. Note that the case 100ElemRandLoss corresponds to PureRandLoss, so this case is not repeated.

xxElemRandLoss:

This simulates a structured loss event where a set of randomly chosen TM elements suffers from lost data. This type of loss might occur where unreliable transport mechanisms are used to transport measurements back to the network measurement station. Often the problems with such transport depend on the locations where measurements are made (e.g., locations close to the management station are less likely to suffer congestion based losses). The experiments randomly select xx % of the rows of X to be effected. Note that the case 100ElemRandLoss corresponds to PureRandLoss, so this case is not repeated.

xxElemSyncLoss:

This simulates a structured loss event where a group of TM elements all suffer from missing data from the same cause. Hence, the losses on each element are synchronized. This is done by selecting xx % of rows of X to be effected, and a set of times with probability q. Lost data comes from the intersection of the selected rows and columns.

RowRandLoss:

Random element loss, as presented above, is not a particular realistic model for data loss. With flow level measurements, data are collected by a router. If that router cannot collect data, then an entire row of each TM snapshot Z will be missing. The effect on X is to remove a set of structurally associated rows. This loss is simulated by dropping rows from the original TM z (before it is formed into the matrix x).

ColRandLoss:

It is perhaps less likely that a column of the original TM z is dropped from measurement. One can construct scenarios where a software bug causes such an error, but in fact the random column loss scenario is considered primarily for completeness.

Figure 4A:
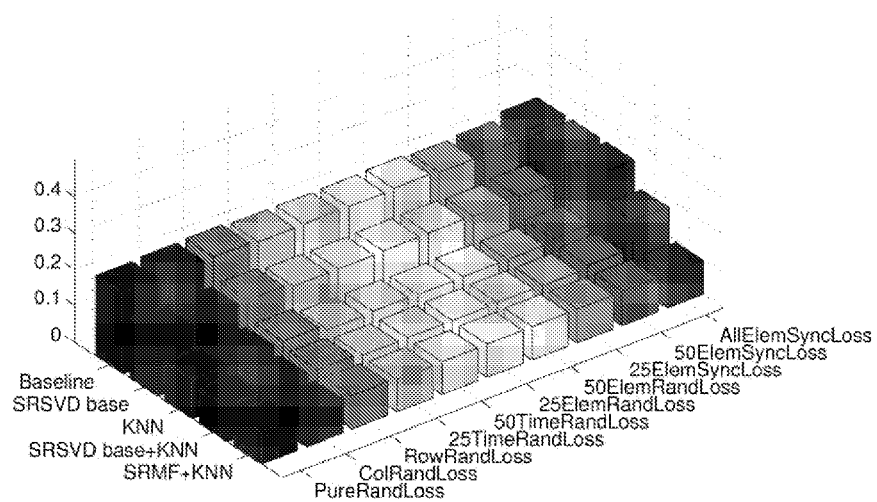
FIG. 4 shows bar charts of the performance of the key algorithms for two different loss levels, across all loss models. The loss probability is set to 0.2 in FIG. 4A and 0.95 in FIG. 4B, respectively.
Figure 4B:
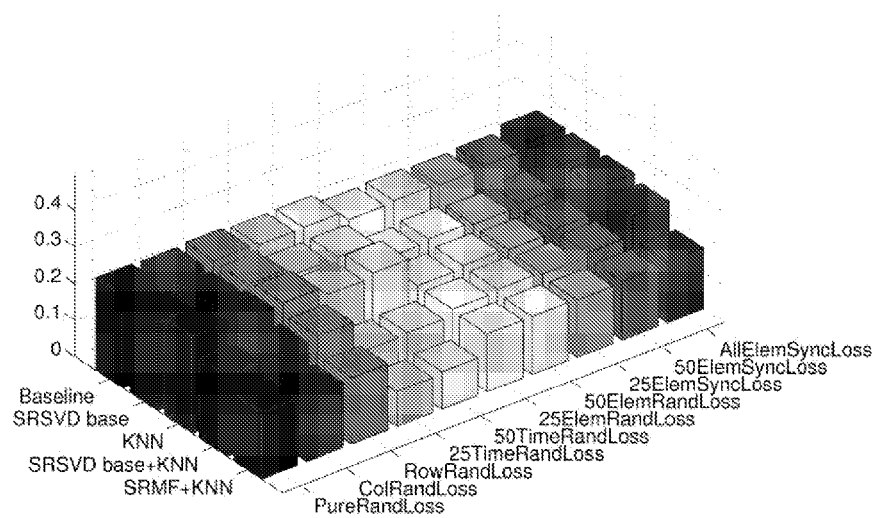

This section examines the impact of the loss model on the performance of the interpolation algorithms. Obviously there are many ways of viewing this data. Due to space limitations, only a few representative ones are presented here. First, FIG. 4 shows bar charts of the performance of the key algorithms for two different loss levels, across all loss models. The loss probability is set to 0.2 in FIG. 4A and 0.95 in FIG. 4B, respectively. The key observations are that for low- to moderate loss, SRMF+KNN performs significantly better across all loss models. When loss is higher, there are some cases where the performance of SRSVD-base and KNN is similar to SRMF+KNN, and occasionally slightly better, but where losses are highly structured (e.g., AllElemSyncLoss) SRMF+KNN is always clearly superior.

Figure 5A:
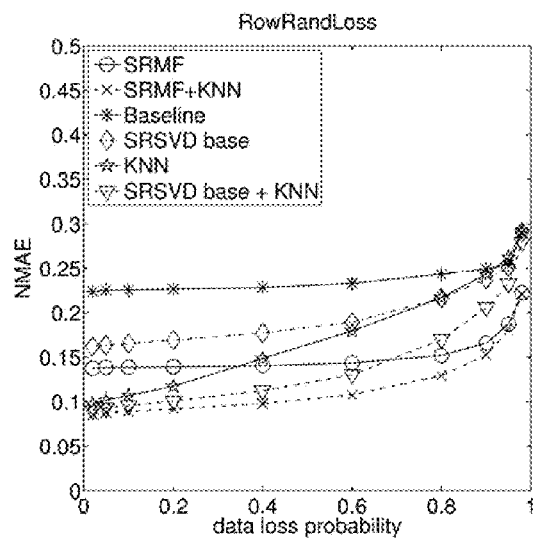
FIG. 5A shows the Abilene network data, with random row loss.

Three of these cases are shown in more detail in FIG. 5. FIG. 5A shows the Abilene network data, with random row loss (i.e., RowRandLoss). The results for random column loss are similar, and both are qualitatively the same as those for pure random loss. The reasons are clear when considering the high loss case where both the baseline (used in SRSVD-base) and the similarity metric used for KNN are hard to calculate because entire rows or columns have no data. On the other hand, the method of embodiments of the present invention combines the spatial and temporal components in its model.

Figure 5B:
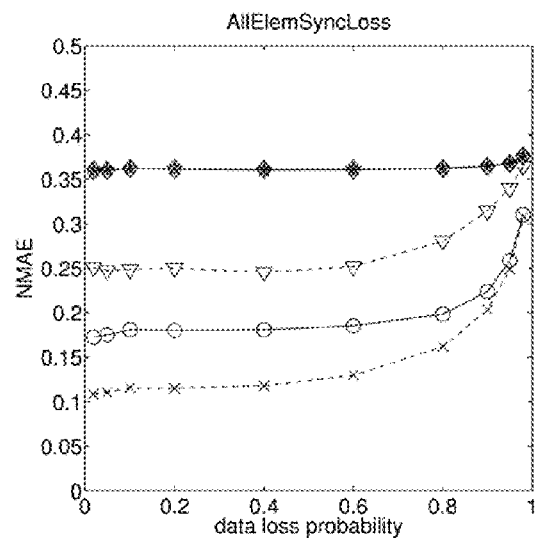
FIG. 5B shows the GÉANT network data, with the extreme of very structured loss synchronized in time.

FIG. 5B shows the GÉANT network data, with the extreme of very structured loss synchronized in time (i.e., AllElemSyncLoss). In this case, the baseline is so poor that all of the other techniques collapse back to this baseline. The method of embodiments of the present invention still performs reasonably.

Figure 5C:
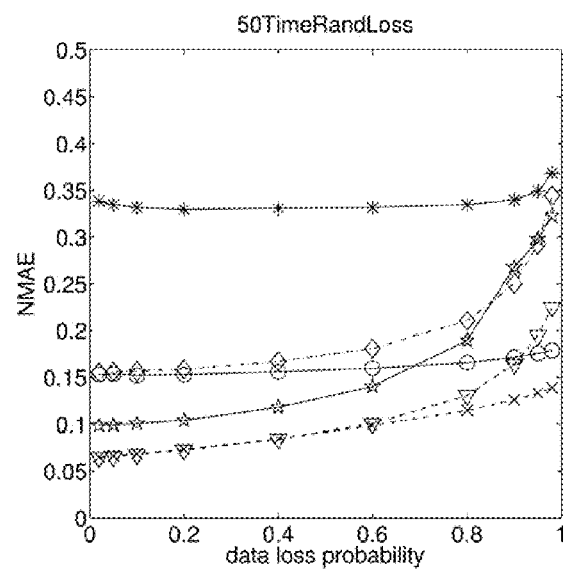
FIG. 5C shows the commercial ISP network data, with random column damage that affects about half of the rows.

FIG. 5C shows the commercial ISP network data, with random column damage that affects about half of the rows (i.e., 50 TimeRandLoss). In this case, the method of the embodiments of the present invention performs surprisingly well given that so much of the structure of the matrix has been lost. This is yet another indication of the importance of the spatio-temporal model.

Summary:

These results show that SRMF+KNN is the best algorithm over a wide range of loss scenarios and loss rates. In the few cases where SRMF+KNN does not win, it is not far behind.

Meanwhile, SRSVD-base+KNN consistently performs better than SRSVD-base, but not as well as SRMF+KNN, especially when there is a large amount of structured loss. These results clearly demonstrate the power of the spatio-temporal compressive sensing framework to simultaneously exploit global and local structures and leverage spatial and temporal properties. It is expected that more detailed modeling of the spatial and temporal constraint matrices S and T will further improve the accuracy.

3.7 Computational Times

The evaluation also measures the computation times of SRMF (KNN takes a small amount of additional time) on matrices of various sizes. The computation time is linear in the number of matrix elements, and quite reasonable. A 200× 1000 matrix (with rank r=10 used in the decomposition) can be approximated in less than 3.5 seconds (using Matlab on a 2.66 GHz Linux machine). Meanwhile, the computation time with respect to r is reasonably modeled by $O(r^2)$.

4. A UNIFIED METHOD FOR COMMON DATA ANALYSIS TASKS

The previous section considered the simple problem of interpolation. This section illustrates several different applications of the approach of embodiments of the present invention, where the meaning or importance of the missing values is determined by the application in question. These examples demonstrate that the approach of embodiments described herein provides a unified framework for a variety of common data analysis tasks, such as tomography, prediction, and anomaly detection.

4.1 Tomography

A special case of the approach of embodiments described herein is the network tomography problem of inferring a TM from link-load measurements. In the previous cases, the constraints come from direct measurements. In network tomography the constraints are given by (1). However, it is common to have some combination of these sets of measurements. So it is desirable to combine them to obtain the best possible approximation to the TM. In this case, according to one embodiment, A can simply be defined to incorporate both (1) and (3), resulting in a combined penalty term of the form $\|A(LR^T)-Y\|_F^2 (LR^T-D)\cdot*M\|_F^2$.

The evaluation concentrates on two simple and relatively well known TM estimation algorithms: gravity model and Tomo-gravity. The gravity model (See Zhang et al. 2005a) is a simple rank-1 approximation to a single TM. It is known to be a poor estimator of real TMs, but it has been successfully used as the first step in the Tomo-gravity (See Zhang et al. 2005a) algorithm. The latter is yet another regularization based on the Kullback-Leibler divergence between the gravity model and the measurements.

The notable feature (for the purpose of this paper) of the gravity model and Tomo-gravity is that neither involve temporal information. They operate purely on a TM snapshot. The gravity model is based purely on row and column sums of the TM (snapshot) and so has no need (or method) for incorporating additional information. However, Tomo-gravity is just a standard regularization, and so additional measurement equations can be easily added.

Illustrative Results

Figure 6A:
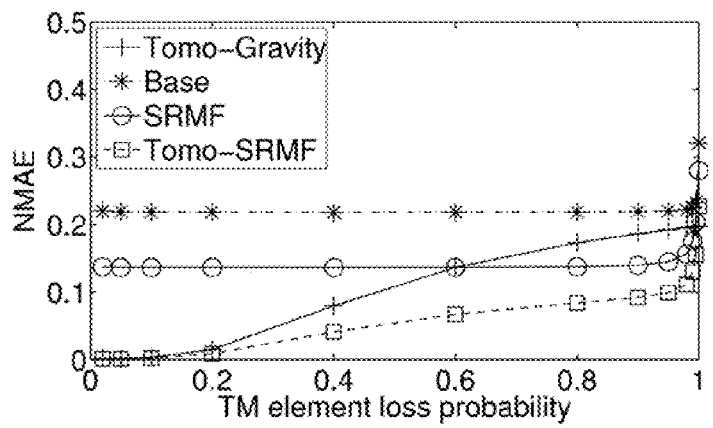
FIG. 6 shows the performance of different algorithms for network tomography with respect to the proportion of the traffic matrix elements that are missing using data from Abilene (FIG. 6A), commercial ISP (FIG. 6B), and GÉANT (FIG. 6C).
Figure 6B:
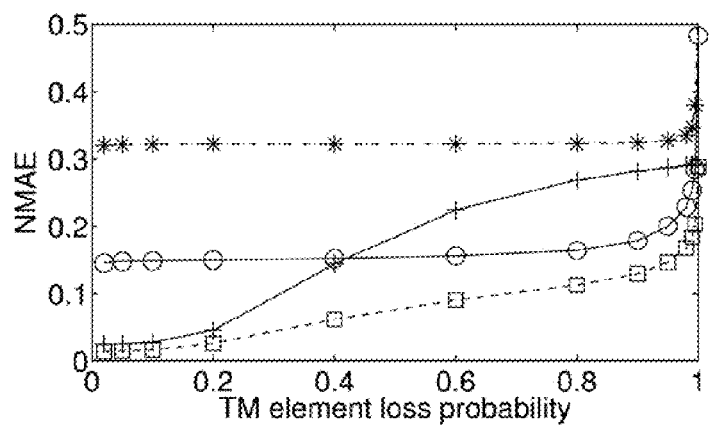
Figure 6C:
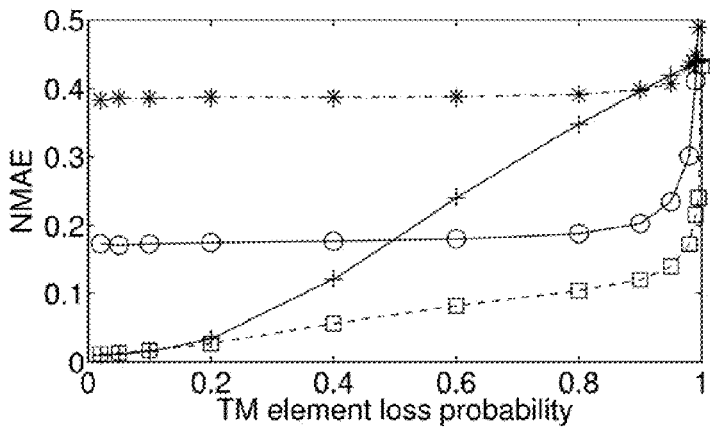

This section compares these algorithms against three alternatives: the baseline approximation, SRMF, and Tomo-SRMF. FIG. 6 shows the performance of the algorithms with respect to the proportion of the TM elements that are missing using TM data collected from Abilene (FIG. 6A), commercial ISP (FIG. 6B), and GÉANT (FIG. 6C). Note that in addition to direct measurement of the matrices, the evaluation assumes that it can measure all of the link loads on the networks. So in this figure, 100% data loss corresponds to the standard network tomography problem. As this part of the figure is important, but relatively hard to read, Table 3 shows duplicated key performance metrics.

TABLE 3

Network tomography performance: the first number is the performance where we have no direct TM measurements, the second shows where we measure only 0.5% of the elements.

| | Abilene | Commercial | GÉANT |
|---|---|---|---|
| Tomo-gravity | 0.197/0.197 | 0.292/0.292 | 0.441/0.439 |
| Base | 0.321/0.233 | 0.566/0.380 | 1.198/0.489 |
| SRMF | 0.280/0.204 | 0.483/0.285 | 1.185/0.516 |
| Tomo-SRMF | 0.227/0.155 | 0.288/0.203 | 0.433/0.240 |

First, note that the gravity model is poor enough that its results lie off the scale. The baseline technique is the second worst in most cases, but is still much better than the gravity model. Second, SRMF performs poorly at the pure network tomography task where no direct measurements are available. However, if even a few (as few as 0.5%) of the TM elements are directly observed, then SRMF's performance improves dramatically, whereas Tomo-gravity's performance improves roughly linearly with respect to the increase in information. Finally, by combining SRMF and Tomo-gravity, Tomo-SRMF gets the best of both worlds and significantly outperforms each individual method by itself. FIG. 6 and Table 3 show the improvements.

Note that Soule et al. 2005 also propose to incorporate flow-level measurements in TM estimation. Compared with their "third generation" TM estimation methods, Tomo-SRMF has two key advantages: (i) it does not require any expensive calibration phase in which entire TMs are directly measured, and (ii) it is highly accurate and can reduce the error of Tomo-gravity by half with only 0.5-5% observed TM elements (whereas 10-20% directly observed TM elements are required according to Soule et al. 2005).

4.2 Prediction

This section considers the behavior of SRMF with respect to TM prediction. This is done by dividing the data into two segments, an initial training segment up to some time t, and then a test segment over which to predict the TM.

Prediction is rather different from the general problem of interpolation. Several techniques (SRSVD and NMF) just fail. KNN does not work well because there are no temporally "near" neighbors, and no spatial neighbors at all. However, significant progress can be made by making use the temporal pattern in the data more creatively. For instance, rather than using a simple nearest neighbors technique, seasonal nearest neighbors can be used. TMs show strong diurnal patterns, and so it is not surprising that offsetting neighbors by the 24 hours period has benefits. In essence, the seasonal nearest neighbor approach assumes that today's traffic has the same pattern as yesterdays.

Likewise for SRMF, there is no need to use the spatial constraint matrix, as an entire slab of the data is missing (i.e., the future data to be predicted). However, to allow a fair comparison with seasonal nearest neighbors, seasonality is also used in constructing the T matrix. Specifically, a difference matrix is constructed, where the interval between the differences is 24 hours.

Illustrative Results

Figure 7A:
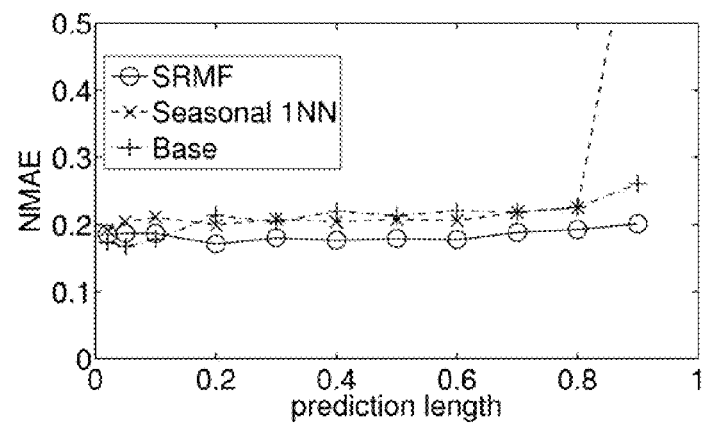
FIG. 7 shows the performance of different algorithms for traffic matrix prediction with respect to the proportion of data being predicted using data from Abilene (FIG. 7A), commercial ISP (FIG. 7B), and GÉANT (FIG. 7C).
Figure 7B:
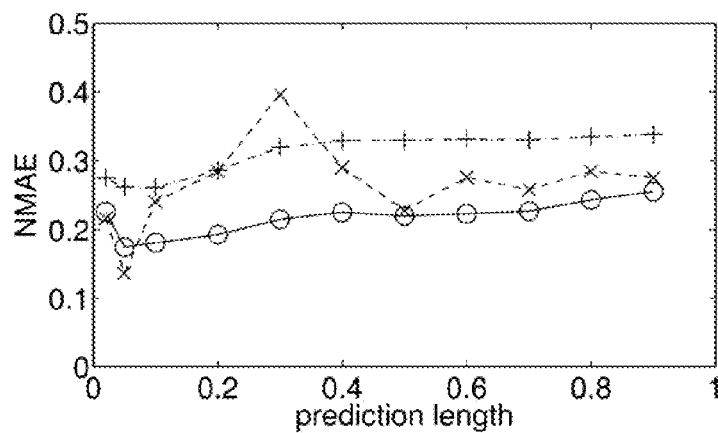
Figure 7C:
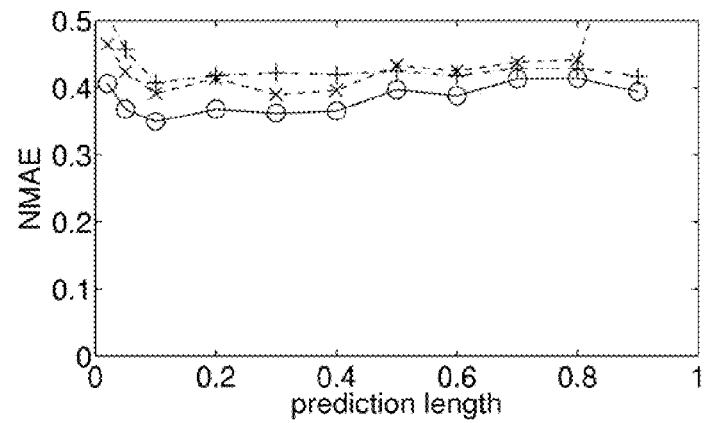

FIG. 7 shows the results with respect to the proportion of data being predicted using TM data collected from Abilene (FIG. 7A), commercial ISP (FIG. 7B), and GÉANT (FIG. 7C). Note that SRMF outperforms the other techniques, and further that SRMF's performance degrades very slowly as the length of data being predicted increases (and the training data gets correspondingly smaller). This shows that typical TMs exhibit temporal regularity and SRMF can effectively take advantage of it.

4.3 Anomaly Detection

A common task in network operations is finding problems. There are specific tools for finding some problems (e.g., SNMP is commonly used to find link failures), and other problems such as specific attacks can be characterized by a signature, which signals the attack. However, both of the above approaches rely on pre-knowledge of the problems that will be encountered. There is a complementary need to find unanticipated problems in networks.

Such problems cannot be characterized before-hand, and so the method commonly used to detect such anomalies is to find significant differences from historical observations. Most approaches involve some transformation of the data followed by outlier detection (See Zhang et al. 2005b). Common examples include simple filtering of the data, Fourier transform, wavelets, or PCA. The transform is aimed at separating the "normal" space of historical events, from the anomalous space. Techniques such as PCA do this explicitly, while others rely on commonly observed properties. For example, Fourier techniques rely on the normal data primarily inhabiting a low- to mid-frequency space, so that anomalies involve high-frequencies such as those incurred by a rapid change. Outlier detection can be performed by taking the normal model of the data, and comparing its values at each time point with the real data, and then seeking points where the difference exceeds some threshold T.

This section will compare several approaches to anomaly detection. To keep things simple so that the reader can gain an intuitive understanding of the various properties of different approaches, this section considers only three algorithms one temporal, one spatial, and the spatio-temporal approach of embodiments described herein. The three approaches used are Differencing:

Differencing is a standard time-series technique to remove linear trends (typical traffic data are non-stationary, and over periods of minutes to hours can often be reasonably approximated as having a linear trend). Differencing also highlights sudden changes, such as a traffic spike or a level shift (See Zhang et al. 2005b). Implicitly, differencing is using the data from the previous time step as a model for the current time, and so it has not received a great deal of consideration in the networking literature, but it provides a simple temporal benchmark against which intuition may be gained. The differencing operator can be written as postmultiplication of X by T=Toeplitz(0, 1, −1), a purely temporal operation that makes no use of spatial correlations between TM elements.

PCA/SVD:

PCA/SVD has received much interest for network anomaly detection in recent years (See, L. Huang, X. Nguyen, M. Garofalakis, J. Hellerstein, M. Jordan, M. Joseph, and N. Taft, "Communication-efficient online detection of network-wide anomalies," *Proc. of IEEE INFOCOM,* 2007 (Huang et al. 2007), Lakhina et al. 2004a, Lakhina et al. 2004b, Ringberg et al. 2007, Xu et al. 2005, Zhang et al. 2005b), and is the only common spatial technique for anomaly detection. As noted earlier, PCA/SVD is applied by choosing the rank r of the normal subspace (based on the power contained in the first r singular values), and projecting the input data X into the abnormal subspace, where artifacts are then tested for size. Implicitly, the approach is looking at the difference between the normal model of the data created by the low-rank SVD approximation and the data itself. Intuitively, the process builds a (simple) model from the historical relationships between TM elements. New time points are compared to see if they satisfy this relationship. If not, they are declared to be anomalies. It is a purely spatial technique, since reordering of the data in time (the columns of x) has no effect on the results.

SRMF:

In this context SRMF is applied directly to the traffic data including the anomalies, much as one would with SVD. The approach of embodiments described herein, however, is truly spatio-temporal as the resulted model involves both the spatial and temporal properties of the underlying TM. The low-rank approximation is then used as a model for the normal data, and the differences between this and the real traffic are used to signal anomalies. Once again, the method of embodiments uses the standard method of thresholding these differences to detect outliers.

This section will compare each of these algorithms using simulations. The simulation methodology is intended to highlight the features of the different techniques. The simulation is not claimed to be completely realistic, only that it clearly illustrates the properties of the different anomaly detection techniques. The simulation is performed in two steps: first create the normal traffic, and then inject anomalies. The TM is created by an orthogonal composition of a synthetic gravity model TM (See M. Roughan, "Simplifying the synthesis of Internet traffic matrices," *SIGCOMM Computer Communications Review,* 35(5):93-96, 2005) in the spatial domain, and a periodic Norros model (See, I. Norros, "A storage model with self-similar input," *Queueing Systems,* 16:387-396, 1994 (Norros 1994), M. Roughan and J. Gottlieb, "Large-scale measurement and modeling of backbone Internet traffic," *Proc. of SPIE ITCOM,* 2002 (Roughan et al. 2002)) in the temporal domain. Both models have arguments in their favor but principally one needs to create a TM with low rank, but some local spatio-temporal structure that might be found in a real TM.

The simulation uses this model to generate 1000 instances of the TM X consisting of one weeks worth of measurements at 15-minute intervals. In each instance one anomaly is injected. The anomaly is a spike added to the TM at a single randomly chosen time point, so that one anomaly cannot interfere with the detection of another. The value of the spike is a vector of Gaussian random variables (in each element of the TM). The total size of the spike (measured by its $L_2$ norm) is normalized to be a fixed size, which varies from 0.1 to 100. Spikes of size 0.1 (in the dataset used here) are almost indistinguishable (by the naked eye) from the standard random variations in the traffic. Spikes of size 100 are much larger than the typical TM elements, and so are easily observed. The evaluation then applies each of the three techniques above to create a "normal" traffic vector, and detects anomalies by thresholding on differences between the normal and measured vector. Note that there is no missing data in the inputs (it is not obvious how to fairly compare the three algorithms when there are missing data, given the better interpolation performance of SRMF). However the anomalies are included in the inputs, so that both SVD and SRMF can be compared fairly.

An important detail is the choice of thresholds for outlier detection. Non-stationarity in the dataset makes setting thresholds more difficult than in some problems. When the anomalies are small, a little fine tuning allows the discovery of threshold values that are statistically indistinguishable for all three methods.

Illustrative Results

Figure 8A:
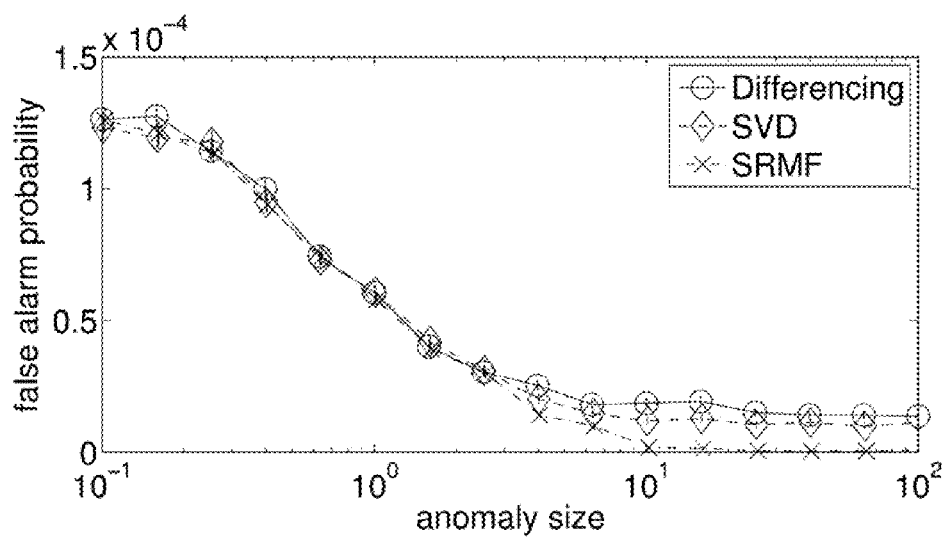
FIG. 8 compares the false-alarm probabilities (FIG. 8A) and detection probabilities (FIG. 8B) for different anomaly detection algorithms.

FIG. 8A shows a comparison between the false-alarm probabilities for the three techniques, showing 95% confidence intervals for the estimates. For larger anomalies it is hard to tune the false-alarm probabilities for PCA/SVD. The anomaly pollutes the data used to create the normal subspace, and so invalidates the standard statistical assumptions used to determine thresholds (See Ringberg et al. 2007). So it is hard to obtain thresholds that produce the same false-alarm probabilities for large anomalies, but the differences in these cases will be inconsequential for the results. Likewise, it is hard to tune the false-alarm rate for SRMF and large anomalies, but for the opposite reason: the false-alarm rate drops almost to zero too quickly. Given the high detection rate, this is not a problem in the comparison of results.

Figure 8B:
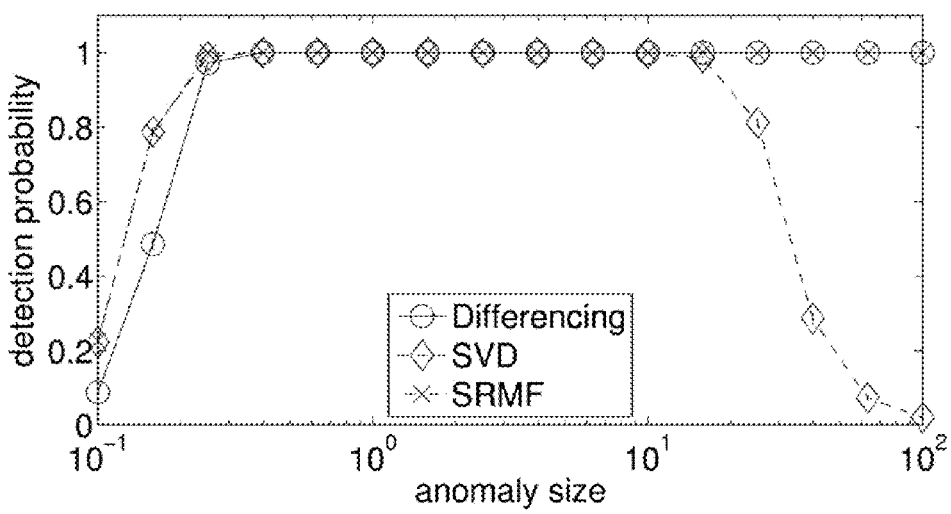

FIG. 8B shows the detection probabilities for the three techniques. First, compare PCA/SVD and Differencing for small anomalies. When anomalies are small (in value) and hence the differences they create will be small, the probability of detection of these differences will be small. Note that, even though a larger false-alarm probability is allowed as the anomalies get smaller, the detection probability for Differencing drops dramatically. On the other hand, PCA/SVD exploits the spatial relationships between the data elements. It uses all the information available at a particular time point instead of processing the information from each time sequence independently. While the performance of PCA/SVD also declines for smaller anomalies, it is much better than Differencing.

For moderate sized anomalies, both techniques have perfect detection records. These anomalies are not particularly hard to detect whichever method one uses. On the other hand, when large anomalies are considered, a different story emerges. The larger anomalies pollute the data used to create the normal subspace in PCA/SVD, and this has a tangible effect in that the detection probability drops dramatically. Note that although the false-alarm probabilities of the Differencing and PCA/SVD methods are slightly different, the detection probability of PCA/SVD drops almost to zero, whereas Differencing maintains its perfect detection record. So it is okay to discount the minor difference in false-alarm probability as causing this drop. The result is consistent with those observed in data (See Ringberg et al. 2007).

A solution might be to temporally pre-filter the data to remove large anomalies, and then apply PCA/SVD. This introduces the problem of interpolating data, as noted before. A preferable approach would be to use an approach that deals well with both ends of the spectrum. SRMF provides such a method. FIG. 8 shows its performance. It is evident that its detection probability is statistically indistinguishable from the better of the two other methods for each anomaly size. The false alarm probability is either indistinguishable or well below that of the other two methods. So SRMF provides a method that deals well with the complete range of anomalies.

SRMF does this through its use of a spatio-temporal model. In the case where the spatial model is more effective (small anomalies) this is the part of the algorithm that is "biting", whereas when the anomalies are large, they are being detected in the temporal domain, essentially by differencing. What can be seen here is that by imposing temporal smoothness constraint on $LR^T$, the effect of contamination is much smaller. Intuitively, if too much energy leaks into the normal subspace (as in PCA), then the projection of X into the normal subspace is no longer smooth, which would then result in a too big penalty in the smoothness term. Thus the smoothness term helps to limit the damage of contamination, and avoids the problem seen in PCA/SVD.

It is important to be understood that with the naive choices of temporal operator T used here, SRMF may not be the best prediction or anomaly technique for TMs. Given the wealth of methods available for these applications (e.g., see Zhang et al. 2005b), one can undoubtedly do better by more careful choice of T. However, there is a lesson to be learned here. First, the regularization approach of embodiments described herein can be generalized to apply to any linear prediction/anomaly detection technique through appropriate choice of T. In each case it is desirable to have performance improvements as well, but the more important aspect of this work comes from the features demonstrated above: (i) the approach of embodiments described herein naturally deals with missing data, (ii) it can flexibly include additional data sources (e.g., link data), and (iii) anomaly detection (and exclusion) are an inherent part of the algorithm. These features may be desirable for any set of algorithms based on TMs.

5. CONCLUSIONS

The present invention broadly discloses a method and apparatus for allowing accurate reconstruction of missing values in any digital information represented in the form of a matrix (i.e., two-dimensional array) or more generally in the form of a tensor (i.e., multi-dimensional array). The approach of embodiments described herein comprises three main components: (i) SRMF: a method for obtain a low-rank approximation that is consistent with measurements and knowledge about the spatio-temporal structure of the data, (ii) Tomo-SRMF: a method for enforcing measurement constraints while staying close to the low-rank solution obtained by SRMF, and (iii) a method for combining global interpolation and local interpolation. The approach of embodiments provides a unified framework for common analysis tasks on matrix-formed or tensor-formed data, such as tomography, prediction, and anomaly detection.

Evaluation using real TM data from three operational networks demonstrates the effectiveness of the approach of embodiments described herein. Whether applied to TM estimation (i.e., tomography), TM prediction, or anomaly detection, the methods of embodiments described herein consistently outperform other commonly-used methods and do so across the whole range of missing values scenarios, from purely random ones to highly structured ones where whole columns and/or rows of a TM are missing, and from very low levels of missing values to very high levels (e.g., 90% and more). The technique described herein has been applied to matrices with over 700,000 entries, and the technique can process these in only a few seconds. The algorithms described herein scale linearly with the size of the data so that much larger datasets can be analyzed.

As described above and as will be appreciated by one skilled in the art, embodiments of the present invention may be configured as a system, method or apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for reconstructing missing values in digital information represented in a form of a matrix or a tensor, the method comprising:
    locating low-rank approximations of data that account for spatial and temporal properties of real data;
    using said low-rank approximations of data as a prior solution while enforcing measurement constraints; and
    combining, by a processor, said low-rank approximations of data with a local interpolation.

2. The method as recited in claim 1 further comprising:
    applying spatio-temporal compressive sensing to derive new methods for one of the following: tomography, prediction and anomaly detection.

3. The method as recited in claim 1, wherein said matrix or said tensor comprises one of the following: a traffic matrix, a delay matrix, a social proximity matrix, a digital image, a spatio-temporal signal, a digital video signal, and a coordinate matrix.

4. The method as recited in claim 1, wherein said locating of said low-rank approximations of data that account for said spatial and temporal properties of said real data comprises:
    selecting a temporal constraint matrix;
    selecting a spatial constraint matrix; and
    scaling said temporal constraint matrix and said spatial constraint matrix so that a total violation of said temporal constraint, a total violation of said spatial constraint and a total violation of said measurement constraint are of a same order of magnitude.

5. The method as recited in claim 4, wherein said temporal constraint captures a temporal property and/or a temporal periodicity of a traffic matrix which describes volumes of traffic associated with different source-destination pairs in a network at different times.

6. The method as recited in claim 4, wherein said spatial constraint captures a spatial similarity between rows of a traffic matrix which describes volumes of traffic associated with different source-destination pairs in a network at different times.

7. The method as recited in claim 2 further comprising:
    inferring entries in said matrix or said tensor by satisfying temporal, spatial, low-rank constraints and one or more of said measurement constraints.

8. The method as recited in claim 7, wherein said one or more measurement constraints specify a function of one or more elements of said matrix or said tensor.

9. The method as recited in claim 2 further comprising:
    using said low-rank approximations and temporal and spatial constraints of data as a model of said data;
    comparing its values at each point with said real data; and
    seeking points where a difference exceeds a threshold, wherein said points with said difference exceeding said threshold are flagged as anomalies.

10. The method as recited in claim 2 further comprising:
    using said low-rank approximations and temporal and spatial constraints of said data as a model of said data; and
    predicting future values of said matrix or said tensor using said low-rank approximations and said temporal and spatial constraints.

11. A computer program product embodied in a computer readable storage medium for reconstructing missing values in digital information represented in a form of a matrix or a tensor, the computer program product comprising the programming instructions for:
    locating low-rank approximations of data that account for spatial and temporal properties of real data;
    using said low-rank approximations of data as a prior solution while enforcing measurement constraints; and
    combining said low-rank approximations of data with a local interpolation.

12. The computer program product as recited in claim 11 further comprising the programming instructions for:
    applying spatio-temporal compressive sensing to derive new methods for one of the following: tomography, prediction and anomaly detection.

13. The computer program product as recited in claim 11, wherein said matrix or said tensor comprises one of the following: a traffic matrix, a delay matrix, a social proximity matrix, a digital image, a spatio-temporal signal, a digital video signal, and a coordinate matrix.

14. The computer program product as recited in claim 11, wherein the programming instructions for locating of said low-rank approximations of data that account for said spatial and temporal properties of said real data comprises the programming instructions for:
    selecting a temporal constraint matrix;
    selecting a spatial constraint matrix; and
    scaling said temporal constraint matrix and said spatial constraint matrix so that a total violation of said temporal constraint, a total violation of said spatial constraint and a total violation of said measurement constraint are of a same order of magnitude.

15. The computer program product as recited in claim 14, wherein said temporal constraint captures a temporal property and/or a temporal periodicity of a traffic matrix which describes volumes of traffic associated with different source-destination pairs in a network at different times.

16. The computer program product as recited in claim 14, wherein said spatial constraint captures a spatial similarity between rows of a traffic matrix which describes volumes of traffic associated with different source-destination pairs in a network at different times.

17. The computer program product as recited in claim 12 further comprising the programming instructions for:
    inferring entries in said matrix or said tensor by satisfying temporal, spatial, low-rank constraints and one or more of said measurement constraints.

18. The method as recited in claim 17, wherein said one or more measurement constraints specify a function of one or more elements of said matrix or said tensor.

19. The computer program product as recited in claim 12 further comprising the programming instructions for:

using said low-rank approximations and temporal and spatial constraints of data as a model of said data;

comparing its values at each point with said real data; and seeking points where a difference exceeds a threshold, wherein said points with said difference exceeding said threshold are flagged as anomalies.

20. The computer program product as recited in claim 12 further comprising the programming instructions for:

using said low-rank approximations and temporal and spatial constraints of said data as a model of said data; and predicting future values of said matrix or said tensor using said low-rank approximations and said temporal and spatial constraints.

21. A system, comprising:

a memory unit for storing a computer program for reconstructing missing values in digital information represented in a form of a matrix or a tensor; and a processor coupled to said memory unit, wherein said processor, responsive to said computer program, comprises:

circuitry for locating low-rank approximations of data that account for spatial and temporal properties of real data;

circuitry for using said low-rank approximations of data as a prior solution while enforcing measurement constraints; and circuitry for combining said low-rank approximations of data with a local interpolation.

22. The system as recited in claim 21, wherein said processor further comprises:

circuitry for applying spatio-temporal compressive sensing to derive new methods for one of the following: tomography, prediction and anomaly detection.

23. The system as recited in claim 21, wherein said matrix or said tensor comprises one of the following: a traffic matrix, a delay matrix, a social proximity matrix, a digital image, a spatio-temporal signal, a digital video signal, and a coordinate matrix.

24. The system as recited in claim 21, wherein the circuitry for locating of said low-rank approximations of data that account for said spatial and temporal properties of said real data comprises:

circuitry for selecting a temporal constraint matrix;

circuitry for selecting a spatial constraint matrix; and circuitry for scaling said temporal constraint matrix and said spatial constraint matrix so that a total violation of said temporal constraint, a total violation of said spatial constraint and a total violation of said measurement constraint are of a same order of magnitude.

25. The system as recited in claim 24, wherein said temporal constraint captures a temporal property and/or a temporal periodicity of a traffic matrix which describes volumes of traffic associated with different source-destination pairs in a network at different times.

26. The system as recited in claim 24, wherein said spatial constraint captures a spatial similarity between rows of a traffic matrix which describes volumes of traffic associated with different source-destination pairs in a network at different times.

27. The system as recited in claim 22, wherein said processor further comprises:

circuitry for inferring entries in said matrix or said tensor by satisfying temporal, spatial, low-rank constraints and one or more of said measurement constraints.

28. The system as recited in claim 27, wherein said one or more measurement constraints specify a function of one or more elements of said matrix or said tensor.

29. The system as recited in claim 22, wherein said processor further comprises:

circuitry for using said low-rank approximations and temporal and spatial constraints of data as a model of said data;

circuitry for comparing its values at each point with said real data; and circuitry for seeking points where a difference exceeds a threshold, wherein said points with said difference exceeding said threshold are flagged as anomalies.

30. The system as recited in claim 22, wherein said processor further comprises:

circuitry for using said low-rank approximations and temporal and spatial constraints of said data as a model of said data; and circuitry for predicting future values of said matrix or said tensor using said low-rank approximations and said temporal and spatial constraints.

* * * * *